United States Patent [19]

Giddings

[11] Patent Number: 4,706,133
[45] Date of Patent: Nov. 10, 1987

[54] METHOD AND APPARATUS FOR RECOVERING INFORMATION FROM A VIDEODISC

[75] Inventor: Gary M. Giddings, Laguna Hills, Calif.

[73] Assignee: Discovision Associates, Costa Mesa, Calif.

[21] Appl. No.: 813,341

[22] Filed: Dec. 26, 1985

Related U.S. Application Data

[62] Division of Ser. No. 569,103, Jan. 9, 1984, abandoned, which is a division of Ser. No. 368,792, Jan. 14, 1982, Pat. No. 4,536,863.

[51] Int. Cl.⁴ .................... H04N 5/76; G11B 21/00
[52] U.S. Cl. ............................ 358/342; 360/10.1; 369/32
[58] Field of Search .............. 358/335, 312, 342; 360/10.1; 369/43, 32

[56] References Cited

U.S. PATENT DOCUMENTS

| | | | |
|---|---|---|---|
| 3,518,366 | 6/1970 | Phan | 360/10.1 |
| 4,332,022 | 5/1982 | Ceshkovsky et al. | 369/44 |
| 4,361,849 | 11/1982 | Bolger | 360/10.1 X |
| 4,417,285 | 11/1983 | Mes | 358/346 X |
| 4,555,736 | 11/1985 | Mathieu et al. | 358/342 |

FOREIGN PATENT DOCUMENTS 0007199 1/1980 European Pat. Off. ............. 369/43

Primary Examiner—Aristotelis M. Psitos
Attorney, Agent, or Firm—Discovision Associates

[57] ABSTRACT

A system for recovering information from a videodisc and performing special functions which enhance the operational character of the system. To increase the reliability of landing at or near a target track, provisions are made to search for a track adjacent a target track whose track identifier has been obliterated. Further, a method and means for stepping forward or reverse one field at a time is disclosed. Another aspect of the invention concerns a capability to respond to a random command instruction resulting in subsequent functioning of the system in a random manner. Yet a further aspect of the invention is related to controlled jumping of one or more tracks during vertical blanking time to produce unique forward or backward motions; multiples of playing speed, both forward and reverse, and visual special effects can be realized using the multiple track jumping feature. Finally, a method and means are described which permit synchronous transmission of video from a videodisc to an external using device.

16 Claims, 18 Drawing Figures

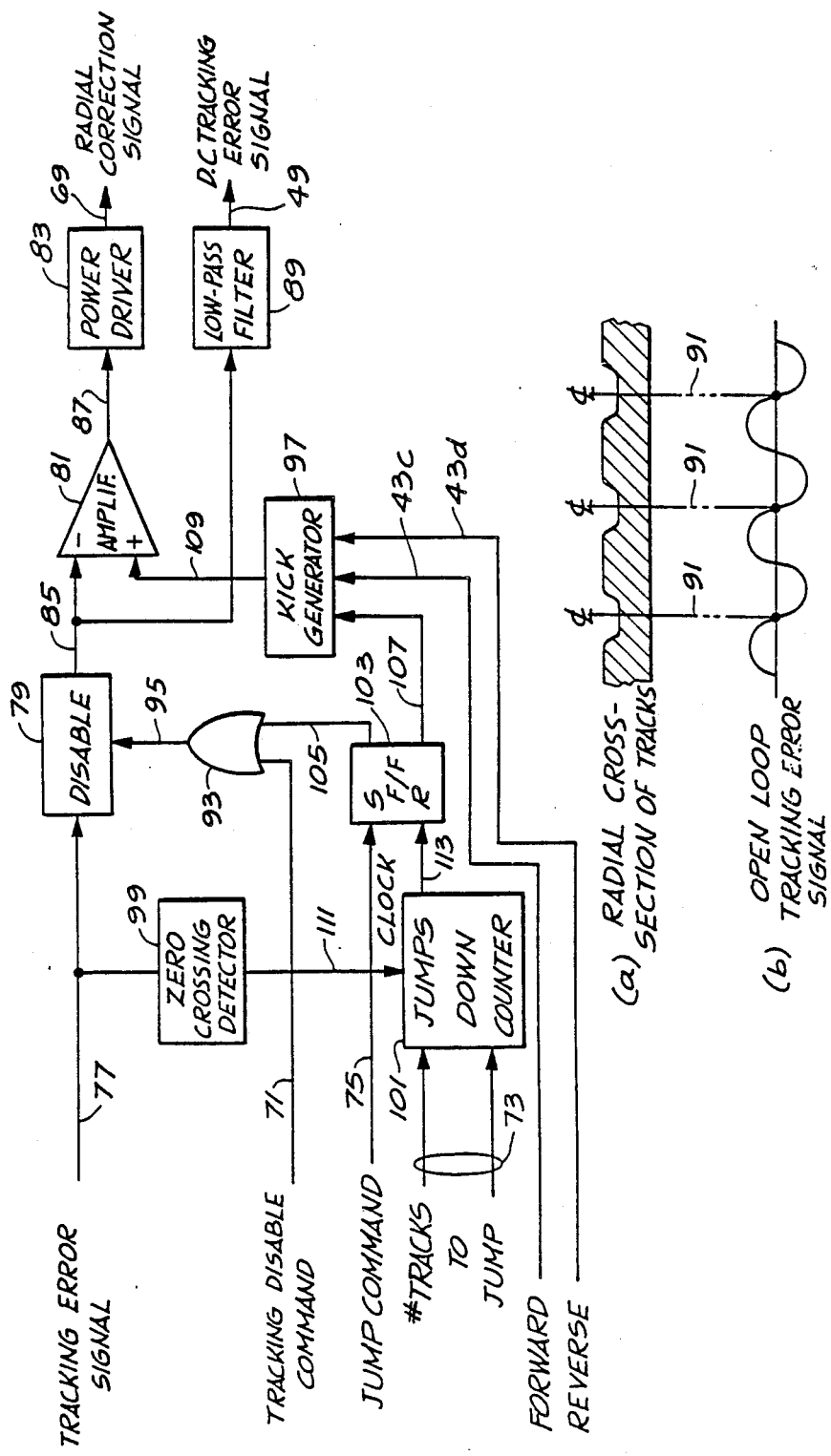

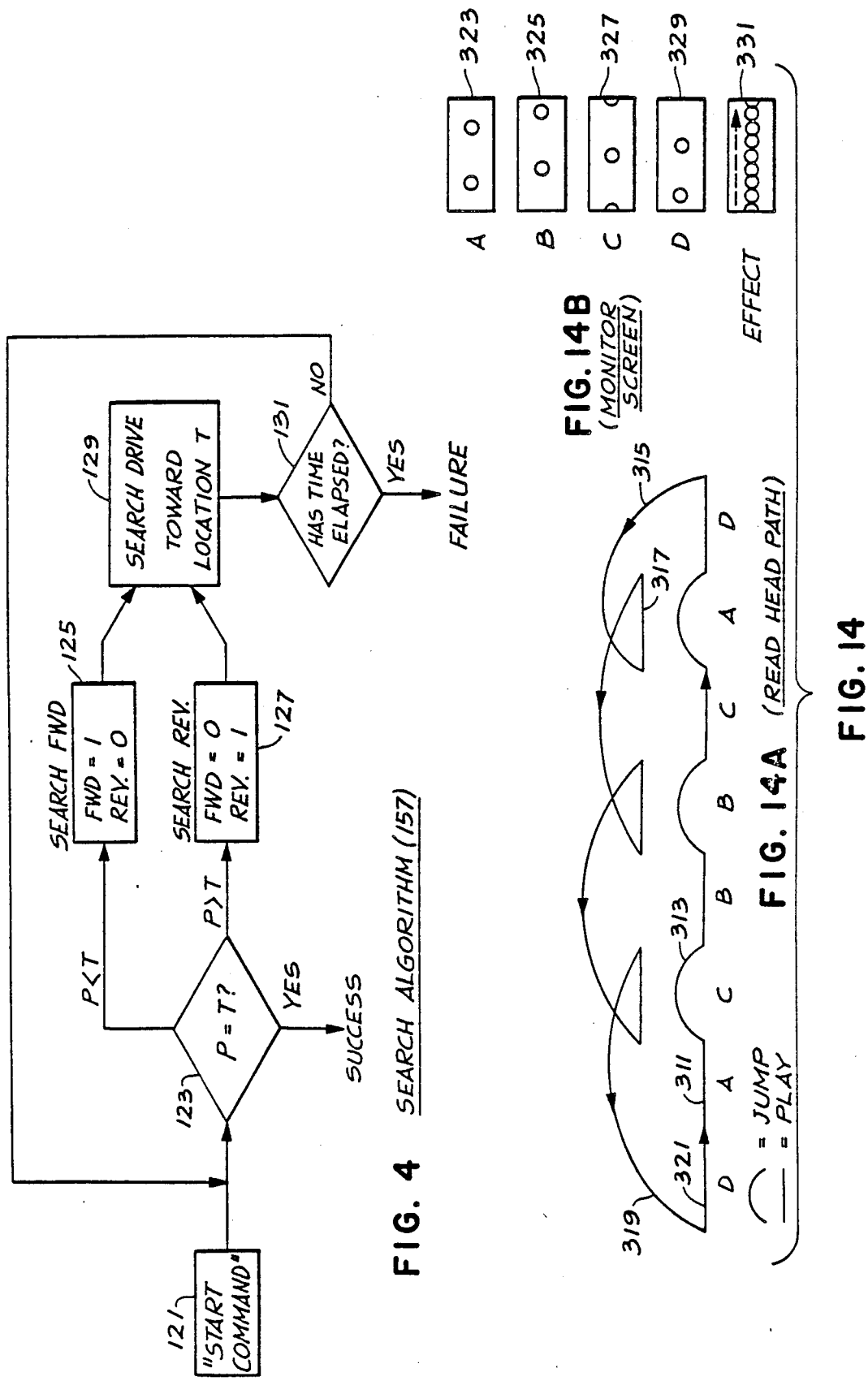

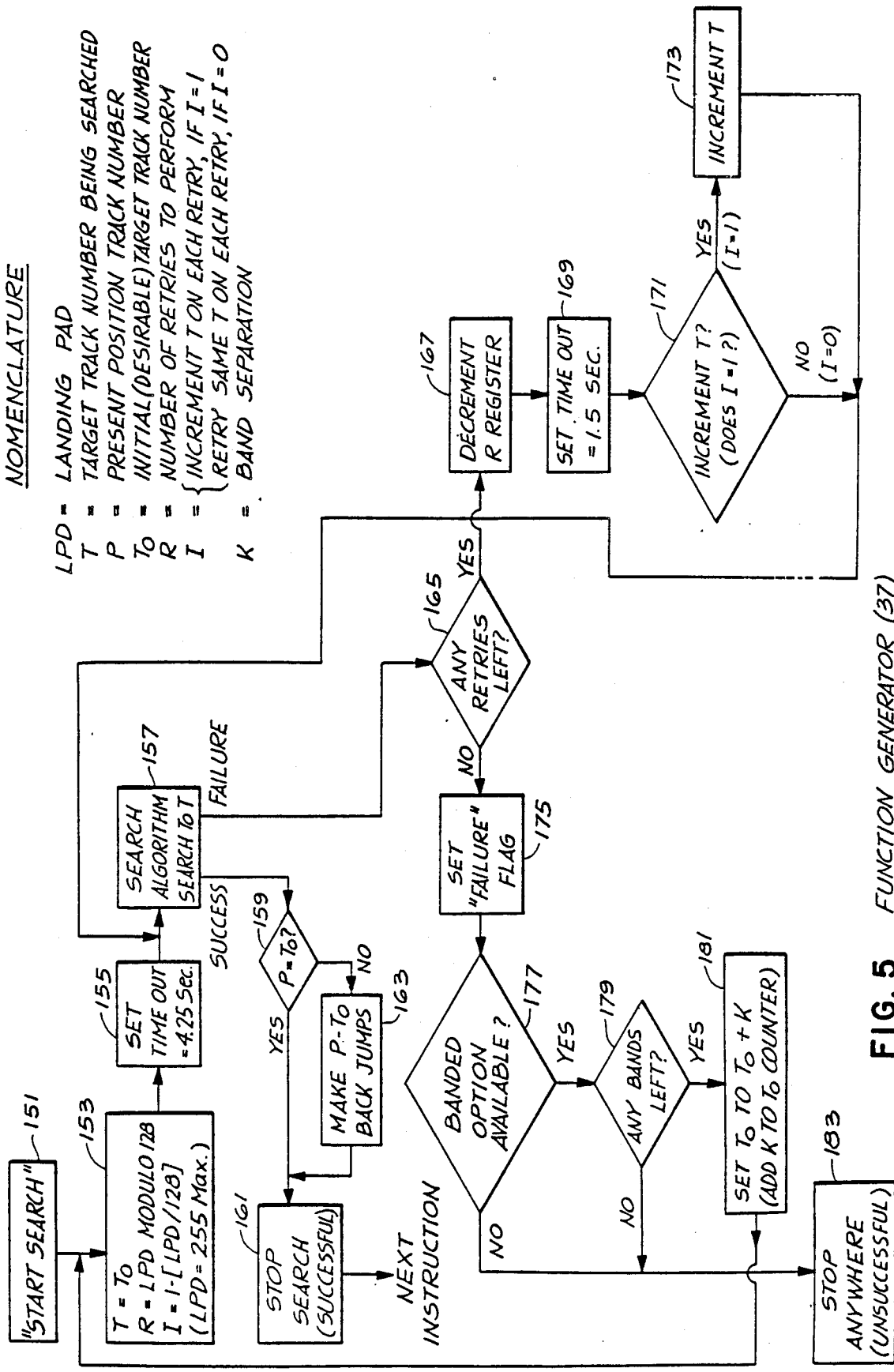
FIG. 5 FUNCTION GENERATOR (37)

FIG. 7 STOP MOTION

STEP FIELD REV.

STEP FIELD FWD

| MODE | NO. OF JUMPS: EVERY FIELD = "1" | JUMP DIRECTION | NO. OF JUMPS: EVERY FIELD = "0" |
|---|---|---|---|
| PLAY X (N+1) SPEED<br>PLAY X (2M+1) SPEED | M | FWD | N |
| PLAY X 5 SPEED | 2 | FWD | 4 |
| PLAY X 4 SPEED |  | FWD | 3 |
| PLAY X 3 SPEED | 1 | FWD | 2 |
| PLAY X 2 SPEED |  | FWD | 1 |
| PLAY FORWARD | 0 |  | 0 |
| STOP |  | REV | 1 |
| PLAY REVERSE | 1 | REV | 2 |
| PLAY X (-2) SPEED |  | REV | 3 |
| PLAY X (-3) SPEED | 2 | REV | 4 |
| PLAY X (-4) SPEED |  | REV | 5 |
| PLAY X (-5) SPEED | 3 | REV | 6 |
| PLAY X (1-N) SPEED<br>PLAY X (1-2N) SPEED | N | REV | N |

METHOD AND APPARATUS FOR RECOVERING INFORMATION FROM A VIDEODISC

This is a division of application Ser. No. 569,103, filed Jan. 9, 1984, now abanonded which is a division of application Ser. No. 368,792, filed Jan. 14, 1982, now U.S. Pat. No. 4,536,863.

FIELD OF THE INVENTION

This invention relates generally to systems for recovering information from video recording discs, and more particularly to a system that moves an information recovery device rapidly, relative to a plurality of information tracks on a videodisc, toward a selected target track on the disc to recover information recorded on the target track. When desired, special functions are subsequently performed which enhance the operational character of the system.

DESCRIPTION OF THE PRIOR ART

An example of a system of this particular type is described in a co-pending application for U.S. patent, Ser. No. 295,629, filed Aug. 24, 1981, and entitled "Method and Apparatus for Information Retrieval from an Optically Readable Storage Medium" now U.S. Pat. No. 4,375,091 and assigned to the assignee of the present application. The disclosed apparatus directs a reading beam of light at a selected one of a plurality of spiraling and substantially circular information tracks or concentric circular information tracks on a rotatable recording disc. The intensity of the beam is modulated by the recorded information which includes a unique address signal for each track, and the apparatus detects the modulated beam to produce a playback signal indicative of the recorded information.

The known apparatus includes means for selecting a particular target track to be scanned, together with a carriage motor and a movable mirror for moving the reading beam radially toward the target track with coarse and fine movements, respectively. The apparatus further includes means for monitoring the playback signal to detect periodically the track identifying code, or address, of the track currently being scanned. Such current address is compared to the target track identifying code, or address, and the apparatus applies prescribed sequential drive signals to the carriage motor, depending on the remaining distance to the target track. The speed of the carriage motor is stepped successively downwardly as the reading beam reaches predetermined distance thresholds during carriage translation. During the last stage of carriage translation, the movable mirror increments the beam radially by one track spacing during each revolution of the disc, thereby "playing" into the target track.

Although the information recovery system described above has proven effective in rapidly moving a reading beam toward a selected target track to recover information recorded thereon, the system does not operate satisfactorily whenever the unique address code for the target track is obliterated or is otherwise not reliably detectable or readable. In prior art disc players of the type described above, in the event that the track identifying code for the target track is obliterated, a "match" of addresses is not possible, and the player either searches to the end of the disc information and idles there or is instructed, under microprocessor command control built into the machine, to perform the search again. In the event that the search function failed on the first pass because it did not receive a proper identifying address code, it is possible that a second search pass will result in success in landing on the target track. This could happen, for example, if the read head was passing laterally of the disc at too fast a rate at the particular time that the address codes contained in the vertical interval portion of the recorded signal was passing by. In such a case, making 2, 3, or even more passes in a search mode could result in an ultimately successful target track "find".

However, no number of retries will result in a successful "find" if the address code for the target track is obliterated due to a surface defect on the disc, or is not readable for any one of a variety of other reasons which can be attributed to the disc making process, the tape to disc transfer process, the tape recording process, and even the encoding equipment used to insert the address codes on the mastering tape in the first instance. In any event, with an obliterated address code for a particular target track, the aforementioned repeated search functioning of the player would be an exercise in futility, since a "match" of addresses would never occur.

It is further to be noted at this point that performing repeated searches in prior art machines required the same amount of time to perform each unsuccessful search, since the search is usually tried for some fixed period of time to locate the designated target track before giving up as unsuccessful. Upon initiation of any search, the time period was set to some fixed constant greater than the longest possible search across the whole disc. In prior art players, this process of unsuccessful searching for a selected target track could span eight seconds of real time. Accordingly, 2 or 3 passes would be an inordinately long length of time for a user to wait for the selected track, even assuming that it could be found eventually. In the event that it was never found, the user would be left with uncertainty as to whether or not the track will eventually be found, and if it is not found, the user must stop the searching process and refigure a new approach to get close to the program material he is desiring to view. In this connection, another U.S. application Ser. No. 316,021, filed Oct. 28, 1981 and entitled "Method and Apparatus for Recovering Information from a Selected Track on a Record Disc", now abandoned in favor of a continuation-in-part application Ser. No. 333,236 filed Dec. 21, 1981, now abandoned. also assigned to the assignee of the present application, discloses an improved searching method and apparatus in which the radial velocity of the search path varies inversely as some function of the difference between the selected target track address and the current address being detected while scanning. Additionally, the latter mentioned U.S. application illustrates an improved search function by permitting the machine to search for the target track from both directions and with changing velocity depending upon distance from the target track. By permitting the player to search in both directions and at variable speeds, the total search time for finding the target track is substantially reduced. This can be appreciated from the fact that, once the read head passes, relatively speaking, the target track, the player merely reverses the direction of motion of the read head relative to the disc to again search for the target track by detecting its identifying address code. Thus, since the read head is already in the vicinity of the target track when its scan motion is reversed, the length of time necessary to reach the target track in the reverse direction is substantially reduced, and this analogy can be carried on indefinitely each time the target track is passed during the search mode. Again, however, in the event that the target address code is never detected because it has been obliterated for some reason, the player will continue its search function indefinitely in the vicinity of the target track. This assumes, of course, that the reader of the disc player is able to retrieve and identify track identifying codes in the vicinity of the target track so that the scan control electronics of the player can detect that the read head has overshot its target.

Whenever the address code of a selected target track is difficult to read or not readable at all, it can be appreciated that prior art disc players suffer from the inability to eventually locate that track or at least to locate a part of the recorded information reasonably close to that originally desired, and additionally such disc players suffer from the inability to stop searching for a target track when it is never to be found. There is thus a need for a system that can provide selection of an information track relatively close to the target track even when the target track identifying code is obliterated, and upon failing that to at least cease searching for an unidentifiable track address after a prescribed length of time has passed in the search mode. There is also a need for a playback system which will, to the extent possible, arrive at a target track even though the target track address identifying code has been obliterated.

Another failing of the prior art closely related to the above-mentioned player operational functions is the inability to freeze frame a selected information track when the white flag or frame address code information is obliterated. In this connection, in the known machines, a freeze frame or still frame as it is known is obtained by repeating two consecutive fields one of which is identified by having a selected horizontal line of information in the vertical interval to represent an all white signal for that line, thereby defining a "white flag". Appropriate detecting circuits are employed to recognize the presence of a white flag, and upon such detection cause the tracking mirror to reposition the beam, during vertical interval, one frame backwards so as to repeat that frame indefinitely. Like the search feature of the player, however, if the white flag is obliterated, the typical player does not use sufficient other information to effect freeze frame operation, and the player will latch onto the next readable white flag and freeze frame the frame associated therewith and not the selected one. Accordingly, there is a need for a player system to be able to freeze frame without the presence of a white flag or the accurate recognition of a selected frame identifying code.

Another shortcoming of the prior art concerns the fact that the program material arranged on a videodisc was rather consecutively structured when the disc was made. In other words, information to be communicated to the user was organized in a rather straight forward cascade of information segments. When, for example, appropriate instruction in a learning situation has been given, a series of questions would be presented to the user to test his learning ability, comprehension, and retention of facts. Accordingly, a series of questions would be displayed on the screen or a similar series of questions would be presented audibly to the user. The problem with such a straight forward approach is that the same disc provides the same questions in the same order each time the user reviews the material. To create a wider interest in the learning process, and to prevent cheating by one student user having learned the order of answers from another student user, as well as for many other related reasons, there is a need to provide a randomness to the manner in which questions to tests are given. Of course, there would also be a need for such random presentation of information even out of a test-giving situation to create additional interest for the user and enhance the overall value of recorded programs. The present invention fulfills this need by providing a disc player capable of random branching among the information tracks so as to present a different resulting program each time the disc is played.

Yet another shortcoming of the prior art concerns the limited ability of the read beam to jump multiple tracks in a synchronized manner. It is known, of course, to perform high speed scans, both forward and reverse, which result in a rather random crossing of tracks by the read beam as the read head and disc move radially of one another at a rather high speed. The picture viewed on a monitor in this scan mode is severely segmented with noise streaks, and the sound is, of course, unintelligible. In the prior art machines, there is the ability to search for a particular frame and freeze frame or begin play at the selected frame as well as the ability to jump backwards one frame to repeat a frame in a freeze frame presentation. However, it is desirable to be able to play the program material at faster than normal speeds, both forward and reverse, and yet be able to view a complete fully synchronized picture while doing so. At speeds close to normal playing speed, it may also be desirable to listen to the sound track, whether forward or reverse, for purposes of establishing reference points and the like. Accordingly, there is a need to provide a playback system which incorporates the ability to jump forward or jump reverse a specified number of frames while yet maintaining full synchronization of the signal viewed on a monitor.

Another problem closely associated with synchronizing effects with the white flag information contained in the vertical interval of the recorded program on the disc, as mentioned by example earlier, is the inability to transfer information from the disc to an external station in synchronization with a command to transmit issued from the external station. In other words, while a disc player provides full internal synchronization of its own recovered signal to a monitor, it is often that external equipment receiving information does not receive such information in full synchronization with its "fetch" commands. Accordingly, there is a need to provide a playback system which can receive a "fetch" command from an external station, wait an appropriate length of time regardless of the relative time between receipt of the "fetch" command and the timing of the information being played by the disc player, and output the required information in full synchronization and compatibility with the external station.

BRIEF DESCRIPTION OF THE INVENTION

It is an object of the invention to provide a method and apparatus for a disc player which has the ability to eventually locate a target track, or at least to locate a part of the recorded information reasonably close to the target track, in the event that the information on the disc identifying the track location has been obliterated. In a preferred embodiment, a further object of the invention is to stop searching for a target track when it is never to be found.

Such an improved search feature for a disc player is realized in the present invention by the provision of a "variable landing pad". As used in this description, the term variable landing pad concerns the desire to search for a particular frame on the disc, and in the event that either the frame number or white flag identifier is obliterated at the desired location, to be able to find another adjacent, or close, frame at which the read head of the disc player stops to complete a search function. It is often the case that a particular frame searched for is not necessarily exclusive insofar as the user is concerned, since one or more frames on either side of the selected frame would be just as valuable for the user.

Of course, when viewing a catalog of items wherein each frame is unique, a variable landing pad in the sense described above is not desirable, since only the particular frame searched for is of value to the user. However, by incorporating the landing pad search feature so that a frame close to the selected frame is found, it is possible for the player to then count up or count back a particular number of frames to arrive at the desired, originally selected, frame, even though the frame number or white flag information identifying that selected frame is obliterated.

In the event that exactly locating a specific frame number is not of extreme importance to the user, such that perhaps as many as 30 frames on either side of the selected frame is an acceptable landing point for the read head, then upon failure to find a selected frame, the search direction can be reversed and a retry to find the same frame would be initiated. After failure to find the selected frame in a predetermined length of time, the search mechanism would try to find an adjacent frame with the same kind of back and forth searching motion for a second predetermined length of time, and in the event of a failure to find the adjacent frame, to proceed in like manner to locate the next adjacent frame, and so forth until an acceptable frame number within a prescribed distance from the originally selected frame number is found. Of course, in the event that no closely related frame is found, the read head can be instructed to merely stop after a prescribed number of retries at whatever frame it is at at the time, or alternatively can be instructed to stop after a predetermined fixed length of time. The advantage of the "retry" function just described is that, since the frame number searched for originally is approached on the first try, each retry can take less search time, so that the ultimate frame landed on will be reached in a substantially shorter time than with a full time period search retry function as has been done in the prior art.

An extension of the variable landing pad feature concerns the ability to take alternative action after a fixed search time has passed or after a predetermined number of retries has taken place as indicated above. The option discussed above was to merely stop and play at such time. Alternatively, if the disc had the program material recorded in two or more bands on the disc (obviously good for relatively short programs only), after failure to find a target track in one band, i.e. after several "retries", the player can search for the duplicated target frame in another band by incrementing the target frame address code by a constant. Again, if the updated target track is not found on the first try, the updated target track plus one would be searched for in a manner described above. Note should be made of the fact that the automatic incrementing to another information band upon failure to find a selected target track in the first band is covered by another application entitled "Banded and Interleaved Videodisc Format", U.S. application Ser. No. 327,321, filed Dec. 4, 1981 and assigned to the assignee of the present application. The incrementing by one frame address and "retrying" are aspects of the present invention, however.

Another object of the invention closely related to the above-mentioned variable landing pad function is to provide a stop motion function, the ability to freeze frame a selected information track, when the white flag or frame address code information of the selected frame to be viewed is obliterated. Further, independent of the fact that a picture frame is comprised of two (and sometimes three) adjacent and consecutive fields, the present invention provides the ability to recover and recognize the vertical synchronization pulses contained in the recorded information on the disc, generate a stop-motion enable signal, and effectuate stop-motion by utilizing the next vertical synchronization pulse in time after generating the enable signal to pulse the tracking servo of the disc player one track in reverse, and for additionally pulsing the tracking servo one track in reverse for every predetermined multiple of two vertical synchronization pulses detected. In a preferred embodiment, the predetermined multiple is one, i.e. the tracking servo is pulsed on every other vertical sync pulse.

In effecting stop-motion by the manner just described, the first field displayed in each group of two fields in the stop-motion mode could be an even field or an odd field, since the jump-back of the tracking servo is initiated by the next vertical sync pulse occurring in time after being enabled by an arbitrarily positioned, usually manually inserted, enabling signal. The present invention permits playing from the stop-motion position by producing a one-field-step-advance or one-field-step-reverse motion while maintaining stop-motion playback of the information track after being stepped. This is accomplished by either disabling the effect of the next vertical synchronization pulse in time after initiation of the field-step enable signal or by permitting an extra vertical sync pulse to "kick" the tracking servo after the field-step mode signal is generated.

Another object of the invention is to provide a disc player and method for generating a random list of instructions for the disc player, so that random information can be presented to the user when such random instructions are encountered on playback of the disc. For example, the disc can contain at one point in a recorded program a series of ten questions occupying ten different tracks on the disc. If each time the user was quizzed he or she was presented with the same questions, the test would quickly become boring. Furthermore, if it was the intent to ask only a few questions, it would be easy for a person taking the quiz to get answers from a previous user, and this would destroy the value of the quiz given. The random command feature of the present invention permits branching out at a particlar point in the program material to one of a group of questions in rather random form. A random number generator is provided, and depending upon the number arrived at randomly, a series of questions, for example three randomly picked from the set of ten, would be presented to the viewer. Upon replaying the disc and arriving at the same point of decision to present questions, the random effect would result in presenting the viewer with a different set of three questions from the available ten. Additionally, even each random question, after it is presented, could branch to another random question or the next in line of a series of questions. In the former case, the questions would indeed be randomly selected individually from a large group, and in the latter case a new group of questions would be selected from possibly a large number of question groups. Of course, other practical uses for the random command feature according to this object of the invention are realizable, and the above are merely examples.

Yet another object of the invention is to provide a method and apparatus for accomplishing multiple track jumps during vertical interval time and in a synchronized manner in order to produce a stable, picture without visible track jumping noise which occurs when tracks are jumped outside of the vertical blanking times. This object of the invention is realized by playing back a selected track on a rotating disc while following the track with a read head, and selectively jumping across a predetermined number of tracks by incrementally moving the read head radially of the disc during the vertical interval of the recovered video signal, and playing at least one field of the recovered video signal after jumping. With this effect, it is possible to play the program material at faster than normal speeds, both forward and reverse, and yet be able to view a "complete" fully synchronized picture while doing so.

Finally, a further object of the invention is to provide a method and means for transferring information from a videodisc to an external station in synchronization. Basically, this feature of the invention permits the successful identification of a particular field of a particular frame searched for on the disc. One of the problems associated with the prior art technology in the videodisc field concerns the need for precisely identifying the first or second (and sometimes third) field of a frame in order that synchronization with external equipment can be effected.

For example, if program material is to be taken from the disc downstream of the lead-in portion, it is necessary to identify when that program material is to be taken off a disc, and to appropriately set up a transmit enable signal so that the occurrence of the next vertical sync pulse will signify the beginning of the program material to be loaded into the external equipment from the disc. This particular feature of the invention is termed "white flag wait", an explanation of the term being presented later in this description.

Another example of the use of the white flag wait feature is that of stop-motion audio where digitized audio is to be taken from a disc and played out in real time while the disc is still framing, and in such a case, it is necessary to transmit the digitized audio information at precisely the appropriate time that it occurs on the videodisc relative to the played-back program. Thus, if the digitized audio is to begin on the first field of a selected frame, it is necessary to generate a transmit signal on the second (or last) field of the previous frame so that the information contained in the next field (and perhaps subsequent fields) is available for being taken off the disc at the exact time that the external equipment is ready to receive it. Without proper field identification, a transmit command could be premature by one field or possibly delayed by one field so that the information transferred to the external equipment is picked up too early or in the middle of the information to be transmitted. The white flag wait feature of the invention is effective to reliably identify the second (or last) field of the frame preceding the frame from which the desired information is to be taken. Of course, in the event that the information to be taken from a disc begins on a second field of a frame, a slight modification of the apparatus can be made to accommodate this altered form of the invention.

In a playback system wherein the video information retrieved from the disc contains in part a sequence of vertical synchronization pulses occurring at a field rate, wherein a complete picture frame is defined by two fields, and wherein a white flag identifies the beginning of the first field of a two-field-per-frame set, the invention is implemented by searching and locating a designated frame next preceding in time the beginning of the intelligence information to be extracted from the disc, identifying the next white flag signal in time, jumping back two fields upon identifying same, and playing the two fields in a forward play mode. Then, utilizing the next vertical synchronization pulse in time, after the jumping back two fields and during playing of the two fields, a transmit enable pulse is generated. The system utilizes the transmit enable pulse to generate a data flow enabling gate at the coincidence of the transmit enable pulse and the next white flag signal occurring in time. This results in the gating of the intelligence information to the external receiving device with the data flow enable gate.

BRIEF DESCRIPTION OF THE DRAWINGS

FIG. 2 is a more detailed block diagram of the portion of FIG. 1 concerning the tracking and track jumping characteristics of the invention;

FIG. 3 is an illustration of the relationship between an open loop tracking error signal and the radial cross-section of tracks on a videodisc;

FIG. 4 is a signal flow diagram used in carrying out the basic search algorithm as particularly used with the variable landing pad aspect of the invention;

FIG. 5 is a signal flow diagram of the portion of the function generator of FIG. 1 used in carrying out the objects of the invention concerning the variable landing pad search mode;

FIG. 14 illustrates the radial path taken by a read head and the visual effect on a monitor screen of the effects of a special arrangement of multiple track jumping with full synchronization;

DETAILED DESCRIPTION OF THE PREFERRED EMBODIMENTS

Figure 1:
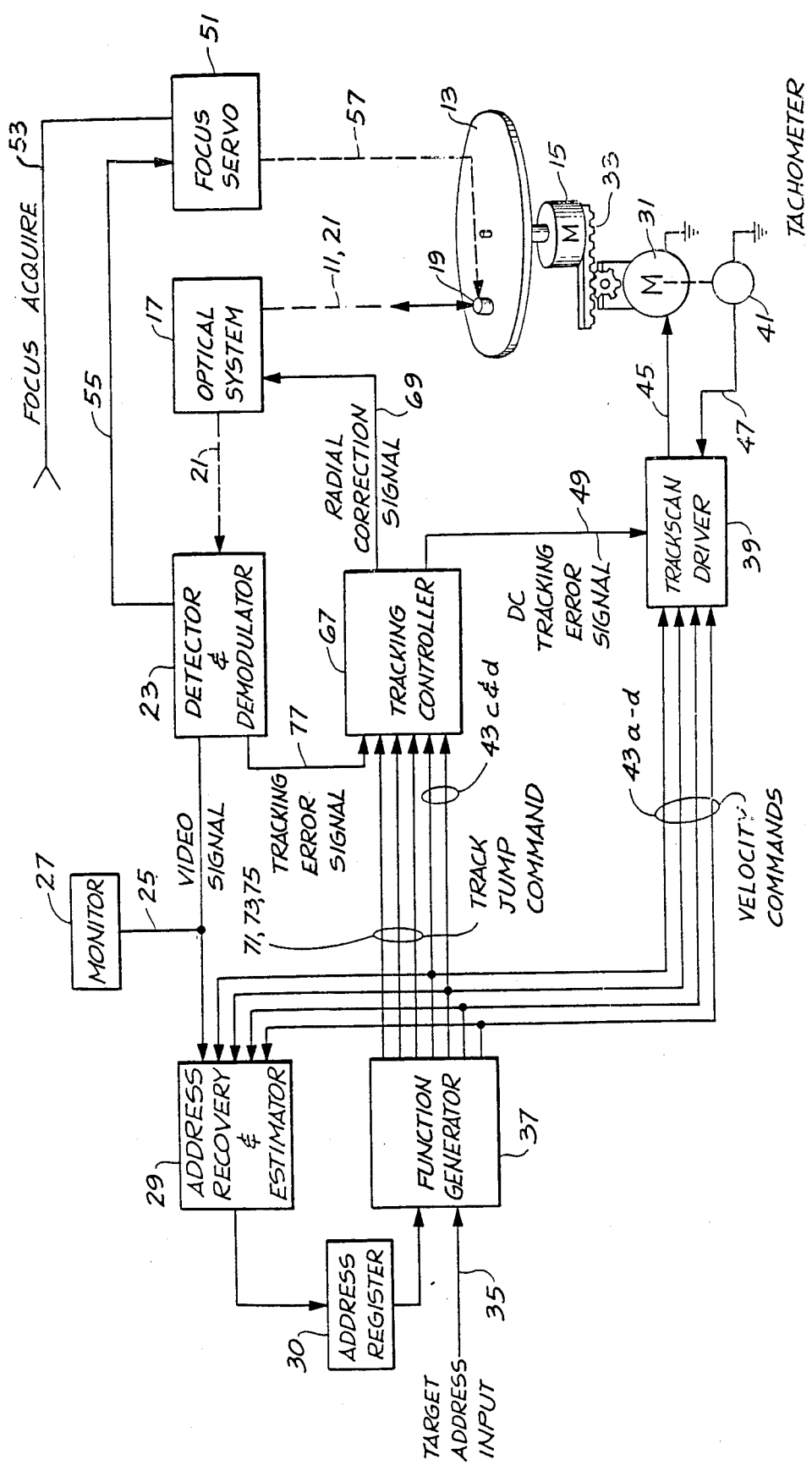
FIG. 1 is a general block diagram of the components of a videodisc player which function to carry out the objects of the invention.

Referring now to the drawings, and particularly to FIG. 1, there is shown apparatus for moving a reading beam of light 11 in a radial direction relative to a rotating recording disc 13, to recover information from a selected target track on the disc. The disc includes a plurality of closely spaced, circular and concentric recording tracks, and each track records a video signal representing one or more video frames, with a unique frame or track address signal located in each vertical interval (i.e., two address signals per frame).

The apparatus includes a spindle motor 15 for rotating the recording disc 13 at a prescribed constant angular velocity, and an optical system 17 and an objective lens 19 for focusing the reading beam 11 onto a selected track of the rotating disc. The reading beam is reflected by the disc to produce a reflected beam 21 having an intensity that is modulated in accordance with the recorded information. The objective lens and optical system direct this reflected beam to a detector 23 which detects and demodulates the modulated intensity of the beam to produce a baseband video signal corresponding to the recorded information. This video signal is coupled over line 25 to both a monitor 27 and an address recovery and estimator circuit 29. The monitor provides a real-time display of the video signal recovered from the target track, and the address recovery circuit detects the address signals in the successive vertical intervals of the video signal, using conventional techniques. The address recovery circuit then updates an address register 30 with each detected track address signal.

The apparatus further includes a coarse positioning system and a fine positioning system for controllably moving the reading beam 11 radially relative to the disc 13, toward the selected target track on the disc. The coarse positioning system includes a carriage motor 31 and appropriate gearing 33 for moving the beam at a selected one of two relatively high radial velocities. (e.g., 100 and 500 tracks per disc revolution). The fine positioning system includes a movable mirror (not shown) located in the optical system 17 for contrallably adjusting the beam's point of impingement on the disc over a relatively small range (e.g., about 50 tracks in either direction).

When a user desires to recover information recorded on a selected target track on the disc 13, he or she inputs a special target address code signal on line 35, indicating the target track's address. A function generator 37 compares this target address signal with the address signal currently being stored by the address register 30. In accordance with a prescribed algorithm described in the aforementioned U.S. patent application Ser. No. 316,021, the function generator determines the radial separation between the current track and the target track, and outputs appropriate control signals to controllably drive the carriage motor 31 and the movable mirror of the optical system 17 so as to move the reading beam 11 toward the target track. These control signals are sequenced such that the beam reaches the target track in a time substantially less than that achieved by prior apparatus of this kind.

The carriage motor 31 is driven at a prescribed velocity (or sequence of velocities) until the reading beam 11 has been moved to the vincinity of the target track, i.e. to within a prescribed number of tracks of the target track, after which the movable mirror of the optical system 17 is conditioned to incrementally jump the beam from one track to the next a plurality of times during each half revolution of the disc 13.

More particularly, the coarse positioning system further includes a track scan driver 39 and a carriage motor tachometer 41 for controllably driving the carriage motor 31 in the prescribed fashion. The function generator 37 outputs a plurality of velocity commands for coupling over lines 43a-d to the track scan driver, which, in turn, controllably adjusts a dc drive signal coupled over line 45 to the carriage motor. The tachometer feeds back to the track scan driver over line 47 a carriage tachometer signal indicating the carriage motor's angular velocity, to enhance control of that velocity. Also, a dc tracking error signal is coupled to the track scan driver over line 49 to controllably move the carriage motor so as to reduce any steady state deflection of the movable mirror of the optical system 17.

Referring again to FIG. 1, the fine positioning system further includes a tracking servo in the form of a tracking controller 67 for producing a radial correction signal for coupling over line 69 to the movable mirror of the optical system 17. Depending on the operating mode of the apparatus, this signal either maintains the reading beam 11 aligned with a selected target track, or incrementally jumps the beam from track to track while approaching the target track. The tracking controller receives a plurality of track jump commands supplied on lines 71, 73 and 75 from the function generator 37, along with a tracking error signal supplied on line 77 from the detector 23.

When the apparatus is operating in a mode in which the reading beam 11 is to be maintained in alingment with a selected track, the tracking controller 67 merely amplifies the tracking error signal and couples it directly to the movable mirror of the optical system 17, to form a conventional closed loop tracking servo for controllably aligning the beam with the track. On the other hand, when the apparatus is in a search mode in which the beam is to be moved incrementally from track to track, the tracking error signal is uncoupled from the movable mirror, and a prescribed sequence of pulses is coupled in its place.

The tracking controller 67 is depicted in greater detail in FIG. 2. It includes a disable switch circuit 79, an amplifier 81, and a power driver 83, for amplifying the tracking error signal supplied on line 77 and outputting it as the radial correction signal for coupling over line 69 to controllably position the movable mirror of the optical system 17 (FIG. 1). The tracking error signal is coupled through the disable circuit 79 at all times except during the search mode of operation or when jumping multiple tracks in a jump mode to be discussed later. The output of the disable circuit is coupled over line 85 to the negative input terminal of the amplifier 81, and the ouptut of the amplifier is, in turn, coupled over line 87 to the power driver 83, which outputs the radial correction signal. The signal output on line 85 by the disable circuit is also coupled to a low-pass filter 89 to produce the dc tracking error signal for coupling on line 49 to the track scan driver 39 (FIG. 1).

At the beginning stage of each search mode of operation in which the carriage motor 31 moves the reading beam 11 rapidly toward a target track, the tracking error signal experiences wide variations in level as the beam crosses the successive tracks. With reference to FIG. 3, which is a fragmentary cross-sectional view of the disc 13 showing three recording tracks along a disc radius, it will be observed that the open-loop tracking error signal is a large amplitude ac signal having a level of zero at the center line 91 of each track. The disable circuit 79 uncouples the tracking error signal from the amplifier 81 at this time, to ensure that the apparatus does not attempt to controllably align the reading beam 11 with any track as it moves radially toward the target track.

In the search mode of operation, the coarse positioning system, which includes the carriage motor 31, operates whenever the distance between the target track and the present track exceeds a prescribed threshold, and the fine positioning system, which includes the movable mirror of the optical system 17, operates whenever this distance does not exceed the threshold. When the coarse positioning system is operating, a tracking disable command is coupled over line 71 from the function generator 37 to the tracking controller 67. This signal is coupled through an OR gate 93, and in turn over line 95 to the disable circuit 79, to uncouple the tracking error signal from the amplifier 81. The radial correction signal output by the tracking controller 67 on line 69 therefore has a level of zero, and the movable mirror remains stationary.

After the reading beam has been moved to a position within a prescribed number of tracks of the target track, the function generator 37 (FIG. 1) no longer outputs velocity commands to the track scan driver 39, and the carriage motor 31 is no longer driven at a relatively high speed. A prescribed time delay thereafter, the function generator terminates the tracking disable command previously coupled over line 71 to the tracking controller 67, so that the tracking error signal is again coupled through the tracking controller to form the tracking servo loop for controllably aligning the reading beam 11 with whatever recording track the beam arrives at. Thereafter, the tracking controller outputs a prescribed sequence of pulses to jump the reading beam incrementally from track to track until it reaches the target track.

To effect the incremental jumping, the tracking controller 67 includes a kick generator 97, a zero crossing detector 99, a jumps-down counter 101, and a flip-flop 103. When the incremental jumping is to be initiated, a binary code indicating the number of tracks (e.g., 11 tracks) to be jumped during the next half revolution of the disc 13 is supplied on lines 73 from the function generator 37 and entered into the jumps-down counter.

Simultaneously, a jump command signal supplied on line 75 from the function generator is coupled to the set direct input terminal of the flip-flop. This sets the Q output signal into the logical "1" state, and this signal is coupled over line 105 to the OR gate 93, and in turn over line 95 to the disable circuit 79, to open the tracking servo loop.

The $\overline{Q}$ output signal of the flip-flop 103 is coupled over line 107 to the kick generator 97, which responds by outputting a single pulse signal for coupling over line 109 to the positive input terminal of the amplifier 81. This pulse signal is coupled through the amplifier and power driver 83 to the movable mirror of the optical system 17, to accelerate the reading beam 11 in the direction of the target track.

After the reading beam has been accelerated in the direction of the target track by the kick generator 97, the zero crossing detector 99 monitors the open loop tracking error signal (FIG. 3b) supplied on line 77 and outputs a clock pulse each time it detects a track crossing by the beam. These successive clock pulses are coupled over line 111 to the clock terminal of the jumps-down counter 101, to decrement the stored count, accordingly. When the count reaches zero, the counter outputs a reset pulse for coupling over line 113 to the reset direct terminal of the flip-flop 103.

The reset pulse coupled over line 113 to the reset direct terminal of the flip-flop 103 returns the $\overline{Q}$ output signal to the logical "1" state, which triggers the kick generator 97 to output a pulse of opposite polarity to that of the original pulse, thereby decelerating the movable mirror. The reset pulse simultaneously returns the Q output signal of the flip-flop to the logical "0" state, so that the tracking servo loop is no longer disabled by the disable circuit 79 and the loop can again function to controllably align the reading beam 11 with the track then being scanned. During this time, the dc tracking error signal is coupled on line 49 to the track scan driver 39, to controllably move the carriage motor 31 so as to reduce the deflection of the movable mirror.

For a low number of tracks to jump, e.g., ten or less, the reading beam 11 preferably traverses the prescribed number of tracks during the vertical interval. Since the monitor screen is then blanked, a noiseless jump will have been effectuated.

The kick generator 97 can include two monostable multivibrator or one-shot circuits, one triggered by a positive-going transition and the other by a negative-going transition. The kick generator can further include appropriate gating circuits to ensure that the successive pulses it produces have the correct polarity to move the reading beam 11 in the direction of the target track. These gating circuits are responsive to the forward and reverse direction commands supplied on lines 43c and 43d, respectively. Examples of other kick generator circuits that can be appropriately modified to provide the recited functions are disclosed in a copending application assigned to the assignee of the present application, Ser. No. 130,904, filed Mar. 17, 1980, and entitled "Tracking System For Player," and in the patents cited in that application.

In an alternative embodiment, the tracking controller 67 radially accelerates and decelerates the reading beam 11 such that it moves by just one track spacing each time. This type of movement is disclosed in the copending U.S. application, Ser. No. 130,904, referred to in the preceding paragraph.

After the reading beam 11 finally reaches the target track, the apparatus can operate, for example, in a stop-motion mode, to scan the track repeatedly and display the recovered video signal. If the successive tracks are arranged in a spiral pattern, the apparatus must jump the beam backward by one track spacing during each disc revolution, preferably during a vertical interval. Suitable apparatus for effecting such track jumping is disclosed in the aforementioned copending U.S. application, Ser. No. 130,904, which is incorporated by reference, and in the patents cited in that application.

Variable Landing Pad

FIG. 4 illustrates the search algorithm in the form of a signal flow chart where a start command 121 initiates a search mode in the player and outputs a "success" signal if the present position (P) is equal to the target position (T) in step 123 which determines the relationship between P and T. It should be recalled here that the function generator 37 (FIG. 1) compares a target address input on line 35 with the present position address from address register 30, and the basic search function is performed in a manner similar to that of the aforementioned U.S. patent application Ser. No. 316,021.

Depending upon which direction from present position the target track is located when the search is initiated, in the event that the address code or white flag information at the target address is obliterated, either a search forward step 125 or a search reverse step 127 will drive the searching elements, carriage motor 31 and tracking mirror of optical system 17, depending upon whether P is less than T or P is greater than T, respectively. The search drive step 129 will continue to drive the searching elements toward the target track at a drive speed which is a function of the distance left to travel to the target track, and if not found will reverse the direction of the search and "look" again, and this procedure will continue indefinitely in the prior art machines. However, the present invention incorporates a step 131 which asks the question "has time elapsed?", and if a prescribed time limit has not passed, the "no" output of step 31 permits a "retry" of the search by initiating another search command at the input to step 123. If the prescribed time has elapsed, then a "yes" output indicates failure to have found the target track searched for.

Turning now to FIG. 5, a more detailed description of the variable landing pad search feature of the function generator 37 will now be described. The search algorithm 157 from FIG. 4 has been incorporated into the more detailed diagram of FIG. 5, and again a "start search" command is given at step 151. The parameters listed in step 153 are then established, where T represents the target track number being searched, R represents the number of retries to perform, and I indicates whether or not the target track identification number should be incremented on each retry. $T_o$ represents the initial (desirable) target track number, and as mentioned earlier, P represents the track number of the track being played at the present position. With these parameters set, a "set time out" step 155 establishes a first time within which a successful search must be made or alternative action will be taken. In the instant case, and by way of example, step 155 sets the time limit for successfully finding the target track at 4.25 seconds.

The "success" result of step 157 is ultimately utilized to affect the stop search step 161 at which time the next instruction in the instruction set is selected. However, in the "success" path is step 159 which queries whether or not P equals $T_o$. That is, if the track number of the present position is equal to the initial target track number, then the search is stopped and the next instruction selected as indicated. However, as will be seen later, a track other than the initial target track may be arrived at, in which case step 163 is effective to operate the tracking controller 67 in a manner to jump (P-$T_o$) tracks in the direction toward $T_o$. In this manner, even though the track number finally searched for and found does not equal the initial track number, the player nevertheless arrives at the initial target track by subsequently jumping the proper number of tracks representing the difference between the track number of the "found" track and the number of the initial target track.

A track other than the desirable target track may be "found" in the following manner. If the identifying code or white flag is obliterated or otherwise not readable at the target track position, a failure will result from step 157, and step 165 will test to determine if there are any retries. A retry is the reversing of the scanning direction after the tracking controller can identify that the difference between the present position track number and the target position track number is increasing, indicating that a successful search was not found as the read beam of the player scans toward the target track and beyond. A prescribed number of retries has already been set in step 153 as indicated earlier. Assuming that a failure to find the target track occurred on the first try, and assuming that the number of retries is greater than zero, a "yes" output from step 165 causes a decrement of the R register in step 167 followed by the setting of a new "time-out" value of 1.5 seconds in step 169. If I=1, the target track number just searched for will be incremented by one in step 173, and the search algorithm step 157 will now perform a further search for a new target track number equalling the previous target track number incremented by one. If, on the other hand, I=0, the target track number is not incremented, and the search step 157 will again search for the same track number as in the previous search step. This process will continue for so long as there are retries left according to step 165 and time has not elapsed in step 131. Since surface blemishes on a disc may span several tracks, it is possible that several adjacent adress codes and/or white flags of adjacent tracks will be obliterated. After some number of retries, however, a successful find of the incremented target track may result in a stop search step 161 as previously indicated. Of course, the search function can look for the same target track as previously searched if the target track number is not incremented in step 171. Since a second try for the same target track number can produce success, it is not always necessary to increment the track number in order to obtain success in finding the track searched for.

It should be noted that the initial time out for the search algorithm was 4.25 seconds, and this is considered necessary, since the target track may have been a substantial distance from the initial position when the start search command was given. However, even if the target track is not found within the first prescribed time-out period, the read beam should be in the vicinity of the target track, and therefore the second time-out length of time is set at 1.5 seconds in step 169. The amount of time set in steps 155 and 169 are purely a matter of choice, and for the present preferred embodiment of the invention, each retry after the first will be allowed 1.5 seconds of time. A limitation, however, on the total length of time allowed for searching is the time set in step 131 which is an overall time for search which can be established at, for example 8 seconds, and even if there is at least one retry left in step 165, a "no" output will result from step 165.

Such "no" result sets a "failure" flag in step 175 which normally would end the search as an unsuccessful search in step 183 and cause the read beam to stop anywhere it happened to be at the time time ran out from step 131 and/or the last retry left in step 165 was used up. Alternatively, if the disc contains multiple program segments in a banded arrangement with each band separated from one another and like program material was also separated by a constant K (in terms of track number code), then step 177 results in a "yes" output, and assuming the first band only had been searched to this point, at least one band would be left in step 179 such that step 181 would add a constant K to the value $T_o$ and initiate a new "start search" input to step 153. This process continues until no bands are left, i.e., the target track incremented by the value K, 2K, 3K, etc. was not found in any band, and step 179 outputs a "no" result to again trigger step 183 to cause the read beam to stop anywhere. Note should be made of the fact that, even when all of the possibilities of retrying, incrementing and retrying, incrementing and retrying and jumping to a duplicated bands and retrying result in failure, the "stop anywhere" step 183 may still reasonably satisfy the user, since all of the searching in the later steps of the search function will naturally put the read beam in the vicinity of the target track, incremented target track, duplicate target track, or duplicate incremented target track.

Since the number of retries is variably set in step 153, and since, likewise, the target track can be incremented with each retry, the read beam will ultimately land on a track adjacent to or close to the initial target track, and this flexibility of selecting the number of retries and ability to increment creates a theoretical landing pad which is variable in width depending upon the number of retries and the time allowed for completing the search.

Figure 6:
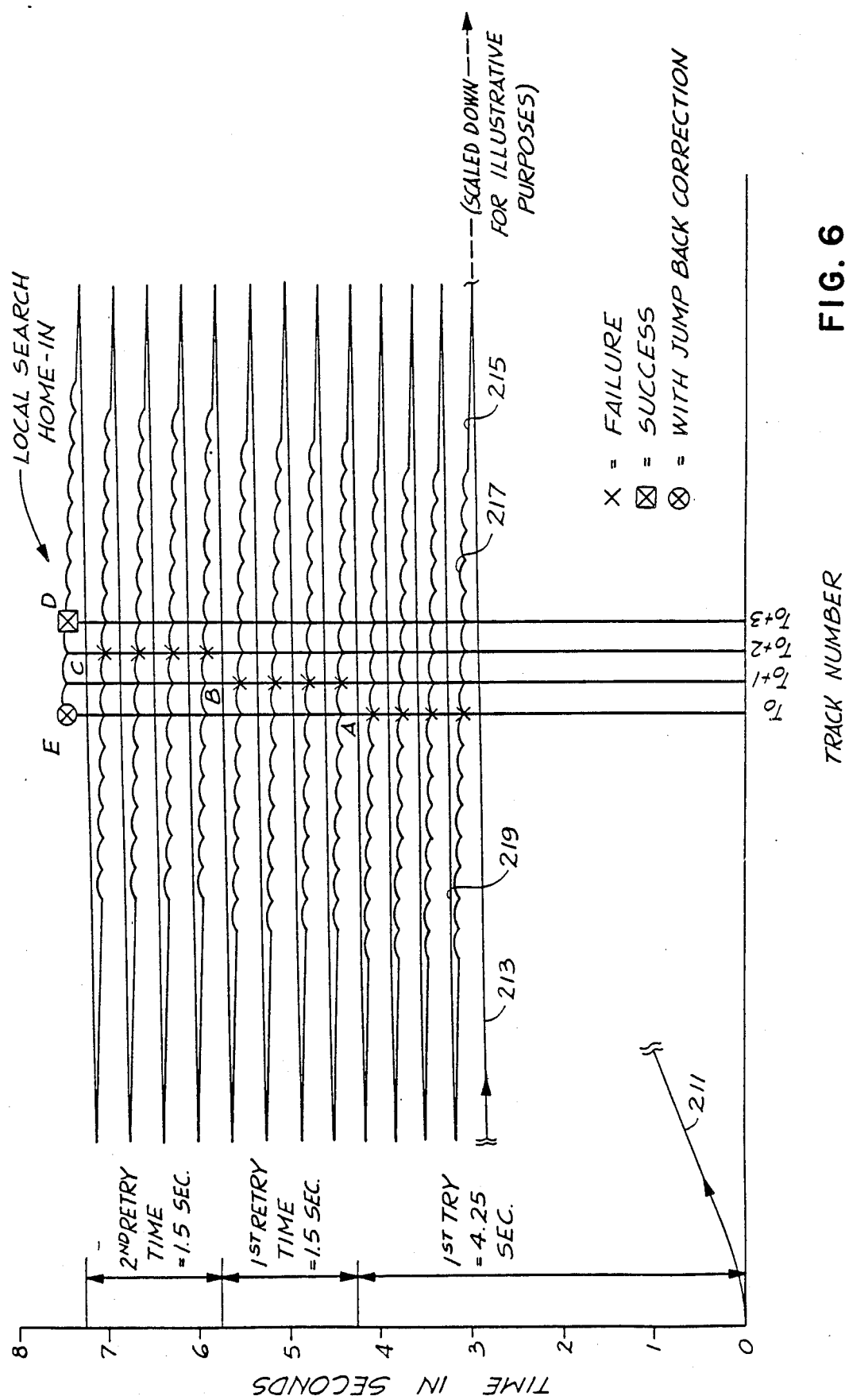
FIG. 6 is a graph illustrating the manner in which a read beam functions to search for a target track in the variable landing pad mode of the invention.

FIG. 6 shows pictorially the theoretical scanning motion of a read beam attempting to locate track $T_o$ starting from track number zero. As the beam initially traverses across the disc, an extremely large number of tracks will be traversed for each second of time, and the scale of FIG. 6 has been adapted to illustrate the variable landing pad feature of the invention and is not necessarily to scale. From the initial search path 211, the read beam traverses path 213 searching for track $T_o$. Having passed it, the player recognizing that the difference between the target track number and the current recovered track number is increasing, it reverses direction and follows path 215. Assuming that the portion of the path 215 is the result of one of the higher speed scanning motions described earlier, an incremented step function, at 217 also described earlier, is used to step the beam to the target tack. Assuming that the target track number (same number) is not found along path portion 217, the scanning beam reverses again to follow path 219, and this procedure continues until a fixed period of time elapses, and in the instant case, the first try as has been just described will terminate at 4.25 seconds, and the beam passing letter A in FIG. 6 indicates that $T_o$ was not found during the first try. From position A, the scanning beam continues to search for an additional 1.5 seconds (first retry), but this time a match in function generator 37 is being looked for between the present position track number and $T_o+1$. If, the first retry time expires, i.e., after 1.5 seconds from termination of the first try, the scanning beam performs a search starting from point B, this time searching for track number $T_o+2$. Not having found $T_o+2$, another retry is initiated at letter C, and a success in locating a track number $T_o+3$ is shown by the letter X in a box at point D. As explained in connection with the description in FIG. 5, although it is optional to do so, the initial target track can now be arrived at by calculating the difference between the track number "found" at D and the original target track number sought. This will effectuate a homing-in in a local search mode by incrementally stepping the read beam from point D to point E (at circle X), and this time is relatively short in the example given, having only to have traversed three tracks to arrive at the initially desired track.

Single Field Step Mode

In order to understand the operation of the field step mode, it is necessary to review the operation of the stop-motion mode of a player.

Figure 7:
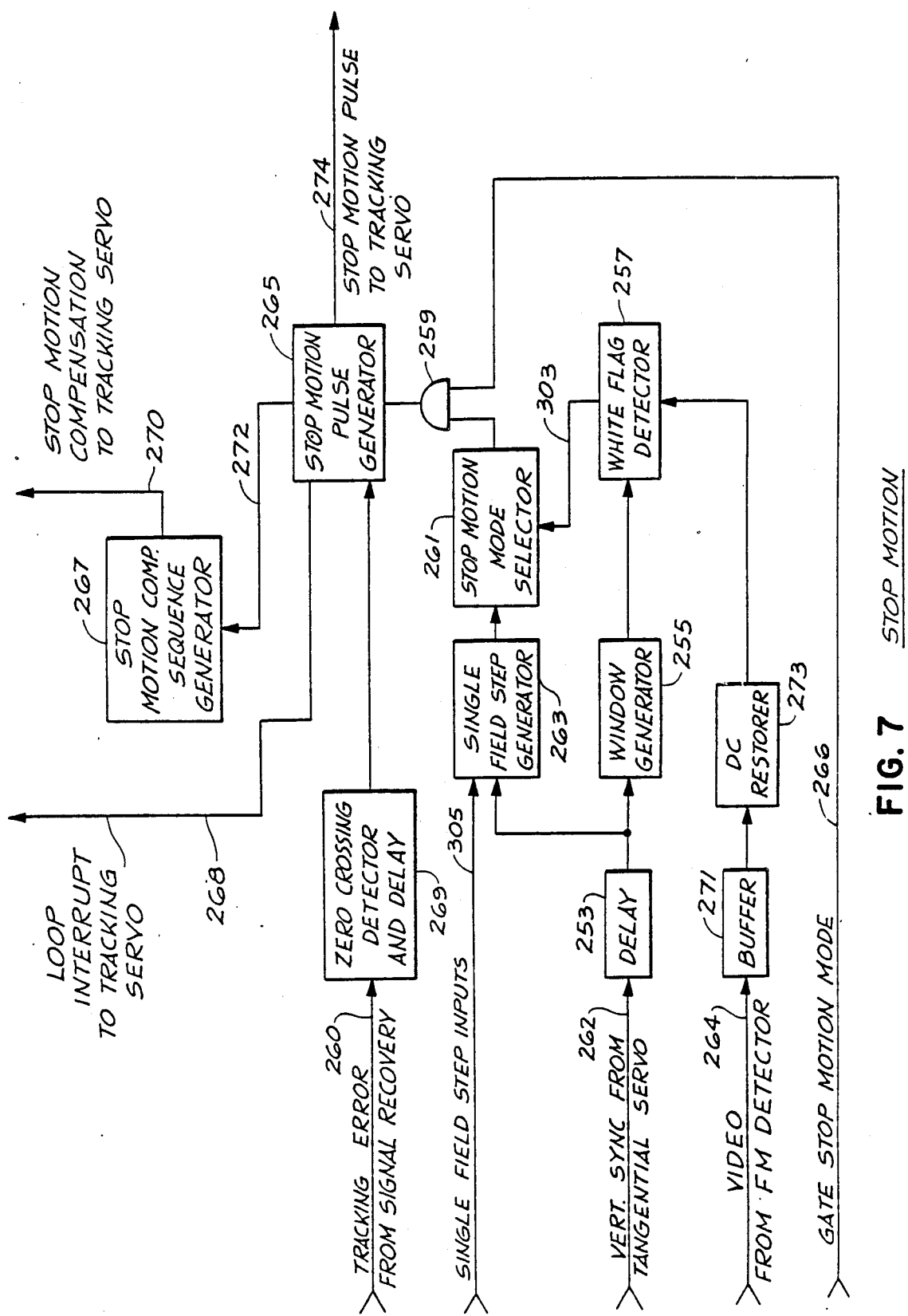
FIG. 7 is a block diagram showing the details of the components of a videodisc player involved in performing a stop-motion effect.

Referring to FIG. 7, there is shown a block diagram of the stop motion subsystem employed in the videodisc player. The video signal from the FM detector and demodulator 23 is applied to an input buffer stage 271. The output signal from the buffer 271 is applied to a DC restorer 273. The function of the DC restorer 273 is to set the blanking voltage at a constant uniform level. Variations in signal recording and recovery result in video signals with different blanking levels. The output from the DC restorer 273 is applied to a white flag detector circuit 257. The function of the white flag detector 257 is to identify the presence of an all white level video signal existing during an entire line of one or both fields contained in the vertical interval of a frame of video information, although the white flag may take other forms. One such form would be a special number stored in a line. Alternatively, the white flag detector can respond to the address indicia found in each video frame for the same purpose. Other indicia can also be employed. However, the use of an all white level signal during an entire line interval in the picture frame of information has been found to be the most useful and reliable.

The vertical sync signal recovered from the video is applied to a delay circuit 253. The output from the delay circuit 253 is supplied to a vertical window generator 255. The function of the window generator 255 is to generate an enabling signal for application to the white flag detector 257 to coincide with that line interval in which the white flag signal has been stored. The output signal from the generator 255 gates the predetermined portion of the video signal from the FM detector and generates an output white flag pulse whenever the white flag is contained in the portion of the video signal under surveillance. The output from the white flag detector 257 is applied to a stop motion pulse generator 265 through gate 259 and stop motion mode selector 261. The gate 259 has as a second input signal, the stop motion mode enabling signal from the function generator 37 (FIG. 1).

The differential tracking error from the detector and demodulator 23 is applied over line 77 (FIG. 1) to a zero crossing detector and delay circuit 269. The function of the zero crossing detector circuit 269 is to identify when the lens crosses the mid points 91 between two adjacent tracks as shown with reference to line (a) of FIG. 3. This mid point is the point at which the differential tracking error shown in line (b) of FIG. 3 corresponds to the mid point 91 between adjacent tracks.

The output of the zero crossing detector and delay circuit 269 is applied to the stop motion pulse generator 265. The stop motion pulse generated in the generator 265 is applied to a plurality of locations, the first of which is as a loop interrupt pulse to the tracking controller servo. A second output signal from the stop motion pulse generator 265 is applied to a stop motion compensation sequence generator 267. The function of the stop motion compensation sequence generator 267 is to generate a compensation pulse waveform for application to the radial tracking mirror in optical system 17 to cooperate with the actual stop motion pulse sent directly to the tracking mirror servo. The stop motion compensation pulse is thus also sent to the tracking servo.

Briefly, the stop motion pulse to the tracking servo causes the radial tracking mirror to leave the track on which it is tracking and jump to the next sequential track. A short time later, the radial tracking mirror receives a stop motion compensation pulse to remove the added inertia and direct the tracking mirror into tracking the next adjacent track without skipping one or more tracks before selecting a track for tracking.

In order to insure the optimum cooperation between the stop motion pulse from the generator 265 and the stop motion compensation pulse from the generator 267, a loop interrupt pulse is sent to the tracking servo to remove the differential tracking error signal from being applied to the tracking error amplifiers in tracking controller 67 during the period of time that the mirror is purposely caused to leave one track under direction of the stop motion pulse from the generator 265 and to settle upon a next adjacent track under the direction of the stop motion compensation pulse from the generator 267.

For a more detailed explanation of the stop motion function of a disc player, reference is made to U.S. patent application Ser. No. 130,904 filed Mar. 17, 1980 and assigned to the assignee of the present invention.

Using the arrangement described above, and assuming stop motion selector 261 passes the output from white flag detector 257 to gate 259, a stop motion effect is realized by causing the player to play two fields in repeated fashion, the first field starting after detection of a white flag occurring during the vertical interval following the second field, and the second field having no white flag preceding it. Accordingly, any time a stop motion command is given the player, the first and second fields of a selected frame will be displayed. A frame advance command to the player would result in the player skipping to the next frame, i.e., skipping two fields such that first field displayed is again initiated by a white flag during the vertical interval, following the second field and the second field without an initial white flag.

As explained earlier, it is often desirable to step through a video display field by field, and this is not possible with the initiation of a stop motion function being coincident with the detection of a white flag which occurs every other field. Accordingly, the present invention provides for the possibility of stepping through one field at a time independent of the occurrence of the white flag. Stop motion selector 261, rather than taking its input from white flag detector 257 can alternatively take its input from single field step generator 263. In such a case, when gate 259 is enabled by a stop motion command, i.e., when it receives the gate stop motion mode enabling signal, the next vertical sync pulse from the tangential servo passing through delay 253 will be effective in the single field step generator 263 to pass through the mode selector 261 and initiate stop motion of the display. Accordingly, independent of the position of the white flag in the incoming video, in the single field step selected mode, any two adjacent fields will be displayed, the single field step generator 263 ensuring that every other vertical sync pulse from the initial one will cause the tracking servo to drive the reading beam in reverse by one track.

Figure 8:
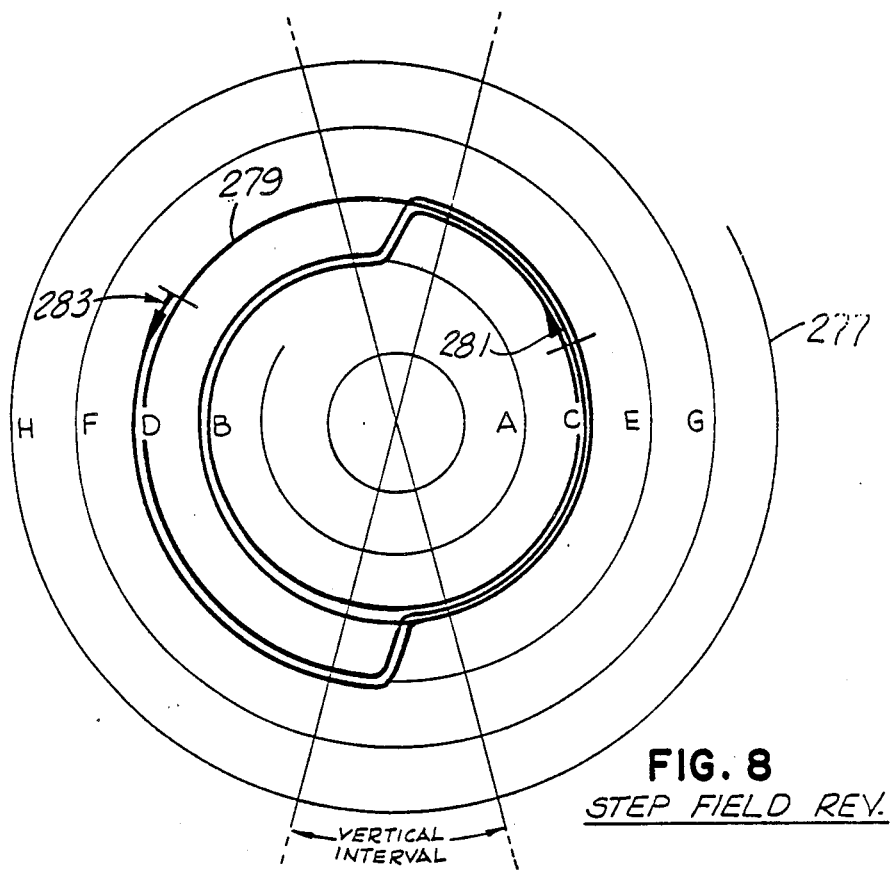
FIG. 8 is a pictorial representation of the path taken by a read beam when stepping one field at a time in reverse direction and then still framing.
Figure 9:
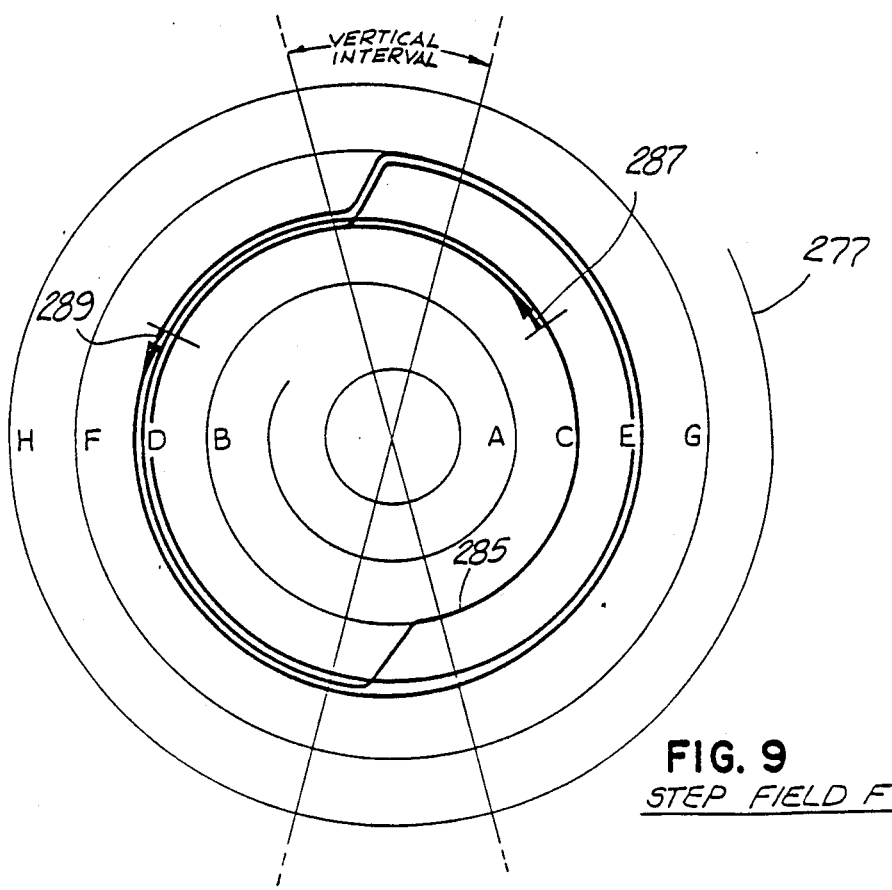
FIG. 9 is a pictorial representation of the path taken by a read beam of a videodisc player when stepping one field at a time in the forward direction and then still framing.

FIGS. 8 and 9 show, respectively, the paths taken by the reading beam along a spiral path in the reverse and forward single field step modes. In FIG. 8, a disc portion 277, greatly exaggerated for purposes of explanation, has a spiral track thereon, with a portion 279 indicating the path of a reading beam in a normal stop motion mode. From this diagram, it can be appreciated that fields C and D are being traversed repeatedly. Assuming the beam is traversing field C when a field step reverse command is given, the arrow at 281 can be followed to illustrate that a jump back must occur at the next vertical interval and then every other vertical interval thereafter in order to have the read beam traverse repeatedly field C and B. It should be recognized that with a normal frame step reverse command, the fields traversed by the read beam would be A and B, while in the single field step reverse mode, the fields being traversed are B and C.

Assuming now that the single field step command was given while the reading beam is traversing field D, the arrow at 283 can be followed to show the need for a jump back at the next vertical interval, followed by a further jump back at the next vertical interval, and thereafter jumping back every other vertical interval. Accordingly, when the command is given during field D, jump back pulses must be sent to the tracking servo for each of the next two vertical interval times.

Turning now to FIG. 9, the single field step forward mode is illustrated. Again, a normal stop motion function is illustrated by the line indicating traversal of the reading beam along fields C and D in a continuous repeating manner. This is shown at 285 in the drawing. Assuming that the jump forward command is given during the traversal of field C, arrow 287 shows that the second next vertical sync pulse should not cause a step reverse, as would normally be the case in order to follow path 285, and this will permit the read beam to continue past that second next vertical interval to traverse field E, after which the next vertical sync and every other vertical sync thereafter will produce repeated playing of fields D and E. Should the command to step a single field forward be given during the traversal of field D, arrow 289 can be followed to show that the next vertical sync pulse in time should be eliminated and that the next vertical sync pulse and every other sync pulse thereafter be used to effectuate a kick back of the tracking servo to again produce repeated playing of fields D and E.

Figure 10:
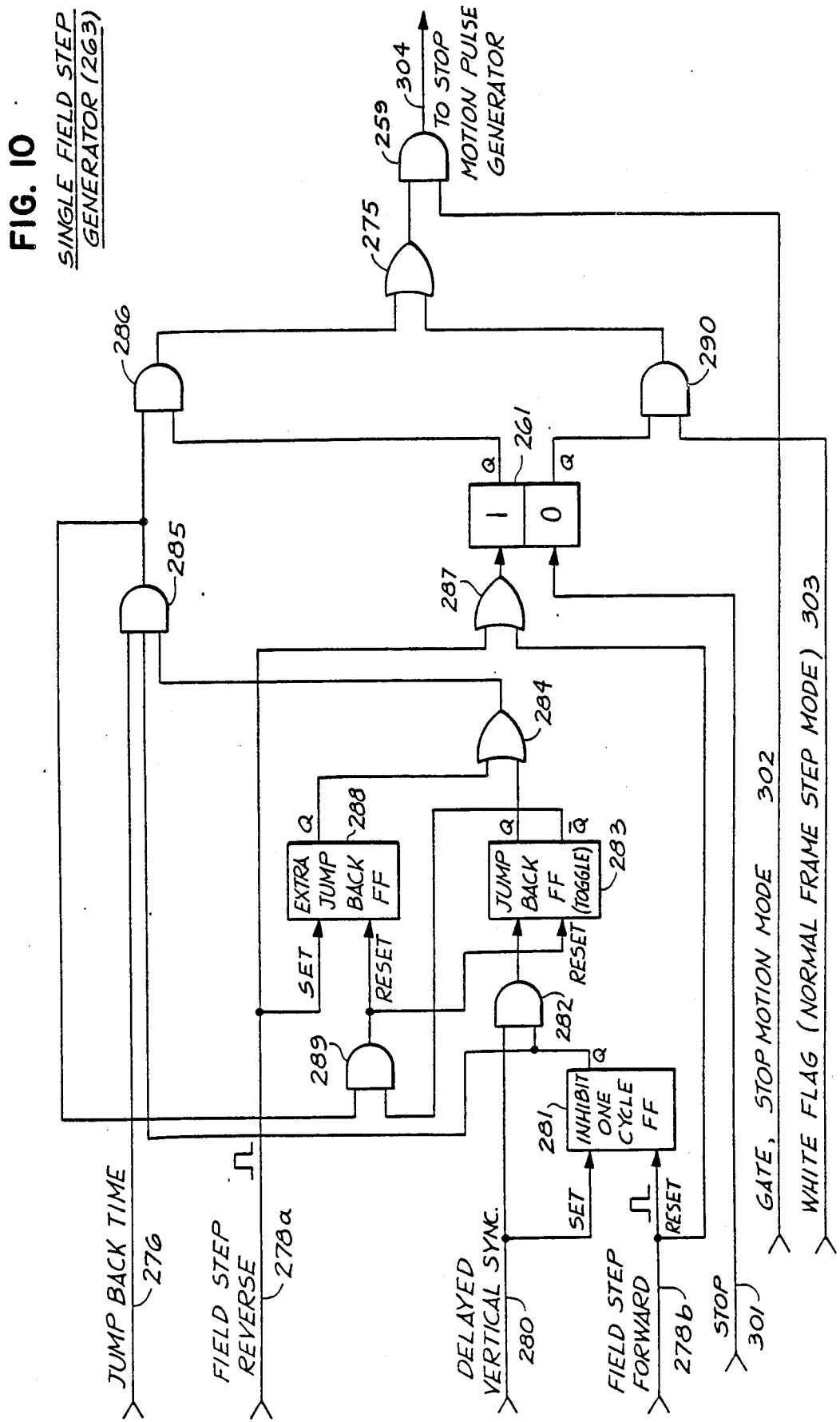
FIG. 10 is a preferred form for the circuitry involved in carrying out the step forward and step reverse one field at a time function.

A more detailed description of the circuitry and function of the single field step generator 263 can be found by reference to FIG. 10. The circuit of FIG. 10 will be explained with the aid of the waveforms diagram of FIG. 11.

In the normal frame stop motion mode, when a stop command is given, flip-flop 261 takes a "0" set, and the Q̄ output enables AND gate 290, while the 1 output, being a logical "0", inhibits AND 286. The enablement of AND gate 290 permits the white flag from white flag detector 257 (FIG. 7) on line 303 to pass through OR gate 275, and arrive at AND gate 259 which, when enabled by the gate stop motion mode signal on line 302, initiates action of stop motion pulse generator 265 on line 304. In this mode, each white flag (one per frame) on line 303 causes a kickback of the tracking servo to repeat the previous two fields in the normal stop motion mode.

When a field step reverse or field step forward pulse is generated, for example manually by the user pushing an appropriate push button, a pulse passes through OR gate 287 to set flip-flop 261 which disables AND gate 290 and enables AND gate 286. Thus, the normal frame step reverse mode is defeated by the disablement of AND gate 290.

Figure 11:
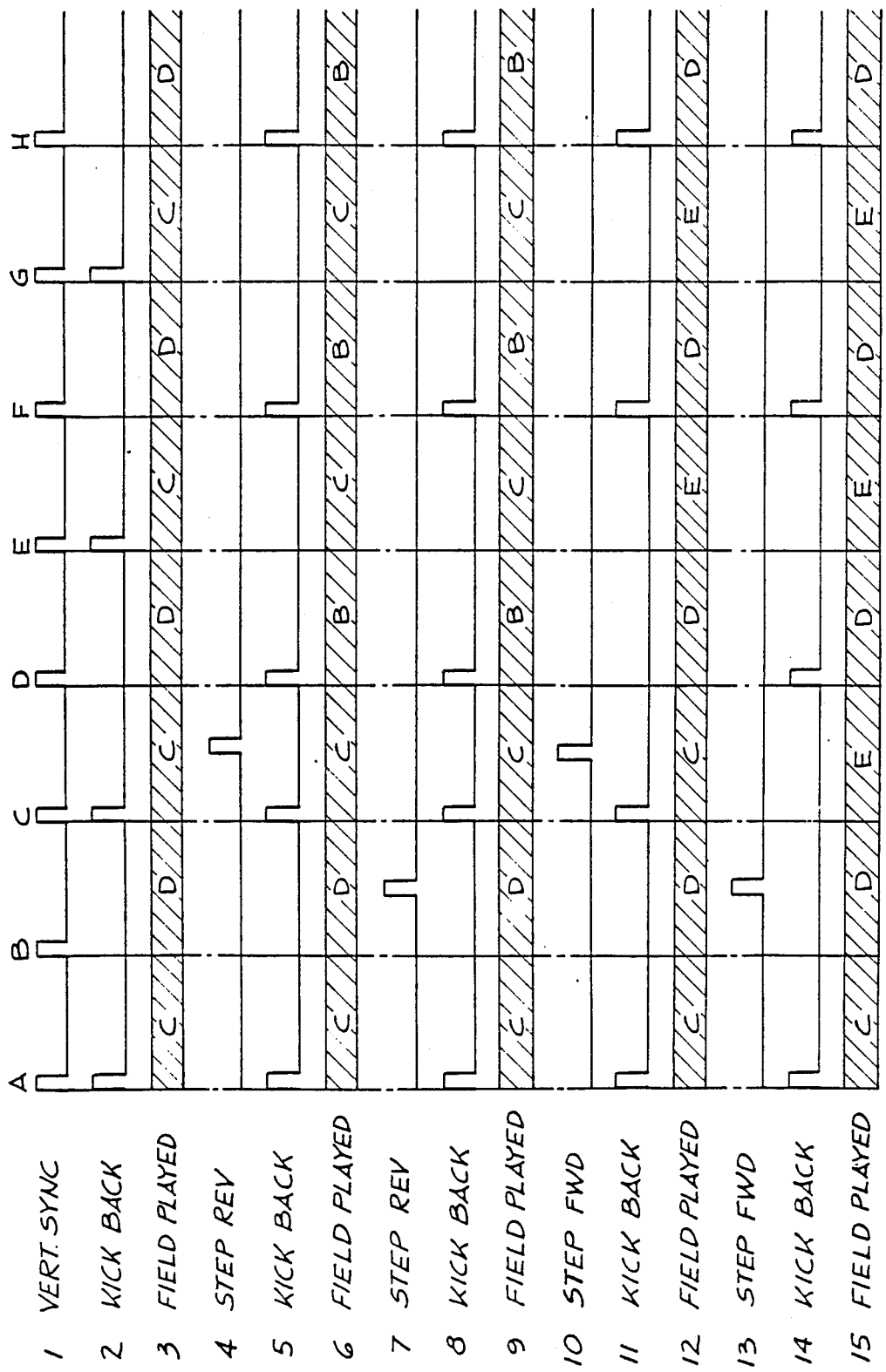
FIG. 11 is a timing chart showing the various signal relationships involved in carrying out the field step function of the disc player.

As explained in connection with FIGS. 8 and 9, the first three lines of FIG. 11 indicate that a vertical sync pulse causes a kickback of the tracking servo for every two vertical sync pulses occurring, and the sequence of fields played is C, D, C, D, etc. If a step reverse command occurs during field C, FIG. 11 shows, at line 5, letter D, that an extra kickback pulse must occur at the next vertical sync time and every other vertical sync time thereafter. This is accomplished in the circuit of FIG. 10 by the setting of extra jump back flip-flop 288 whose Q output passes through OR gate 284 and, when coincident with jump back time pulse on line 276 which ensures that the jump back will occur during the vertical interval and at the proper time during the vertical interval, AND gate 285 passes a true signal through AND gate 286 (previously enabled by flip-flop 261), through OR gate 275, and through AND gate 259 to the stop motion pulse generator. Since the jump back time pulse on line 276 is time related to the vertical sync pulse time, this path of signal flow indicates that the next vertical interval after the initiation of the field step reverse command, i.e., at letter D, will indeed cause the tracking servo to kickback one track. The output of AND gate 285, going true, enables AND gate 289 to reset flip-flop 288. However, the other input to AND gate 289 from the "0" side of flip-flop 283, prevents resetting flip-flop 288. The "0" side of flip-flop 283 is true, because flip-flop 283 has been set by AND gate 282 by the vertical sync pulse on line 280 which, having set flip-flop 281, allows jump back flip-flop 283 to toggle to its true state. Thus, after initiation of the field step reverse command during field C, OR gate 284 receives a true signal on both inputs to effect the kickback at the next vertical sync time. This can be observed by reference to the fifth line of FIG. 11, letter D. The next vertical sync pulse in time (at E), however, does not kick the tracking servo, since the first vertical sync pulse toggled flip-flop 283 to the false state, and this enables AND gate 289 to reset flip-flop 288 such that both inputs to OR gate 284 are false, and thus the second vertical sync pulse has no effect on the tracking servo. This may be observed by reference to the fifth line of FIG. 11 at letter E.

Having reset flip-flop 288, it will not be set again until the next field step reverse command by the user on line 278a is given. However, since flip-flop 283 is a toggle flip-flop, the next vertical sync pluse in time, occurring at letter F in FIG. 11, will set flip-flop 283 to the true state, and the Q output of flip-flop 283 passes through OR gate 284 to again create a stop motion pulse. The continued toggling action of flip-flop 283 for each vertical sync pulse will ensure that, from this point on, every other vertical sync pulse will produce a stop motion pulse, and the objective set forth in connection with the description of FIG. 8 for a step reverse pulse occurring during field C will have been accomplished. Line 6 of FIG. 11 then shows the resultant order of fields being displayed, and it can be seen that after the field step reverse command, fields B, C, B, C, B, etc. are being displayed, as is desired.

In the event that the field step reverse command occurs during field D (see line 7 of FIG. 11), the 0 side of toggle flip-flop 283 will be true enabling AND gate 289. At the next vertical sync time (at C), toggle flip-flop 283 will flip to its true state, and through OR gate 284 a stop motion pulse will be generated at jump back time in the manner previously described. At the same time, the output of AND gate 285 will be sent to the second input of AND gate 289, and as a result flip-flop 288 will be reset, as well as toggle flip-flop 283. Thus, although flip-flop 283 was reset by toggle action on the previous vertical sync pulse, it is now reset again on the next vertical sync pulse through the path just described, i.e., through OR gate 284, AND gate 285, and AND gate 289. Thus, when a subsequent vertical sync pulse occurs, at letter D in FIG. 11, another stop motion pulse will be generated due to toggle flip-flop 283 going true again. As a result, two kick back pulses in a row, at times C and D in FIG. 11, will have occurred to produce the sequence of fields being played as shown in line 9 of FIG. 11.

To accomplish a field step forward function, it is only necessary that the effect of the next vertical sync pulse in time be eliminated, therefore producing a sequence changing from the recycling of fields C and D to the recycling of fields D and E, and this is true whether the field step forward command occurred during the playing of field C or field D. To accomplish the field step forward function, an "inhibit one cycle" flip-flop 281 is employed. When the field step forward command is received over line 278b, flip-flop 281 is reset to the 0 state, and the Q output goes low to inhibit AND gate 282 and AND gate 285, thereby precluding passage of the next vertical sync pulse in time (at D for lines 10–12, and at C for lines 13–15 of FIG. 11) to the jump back toggle flip-flop 283, and to preclude the next jump back time pulse on line 276 to create a stop motion pulse. However, the second next vertical sync pulse in time (at E and D, respectively) will again set flip-flop 281, and its output going true will again enable gate 282 to pass the vertical sync pulses occurring thereafter, will enable AND gate 285, and permit stop-motion action to resume. Accordingly, after elimination of one vertical sync pulse for each field step forward command, the toggle flip-flop 283 proceeds to produce a kickback of the tracking servo for every other vertical sync pulse in the manner described earlier. The waveforms of lines 10 through 15 of FIG. 11 should be, therefore, self-explanatory.

Random Command Function

Figure 12:
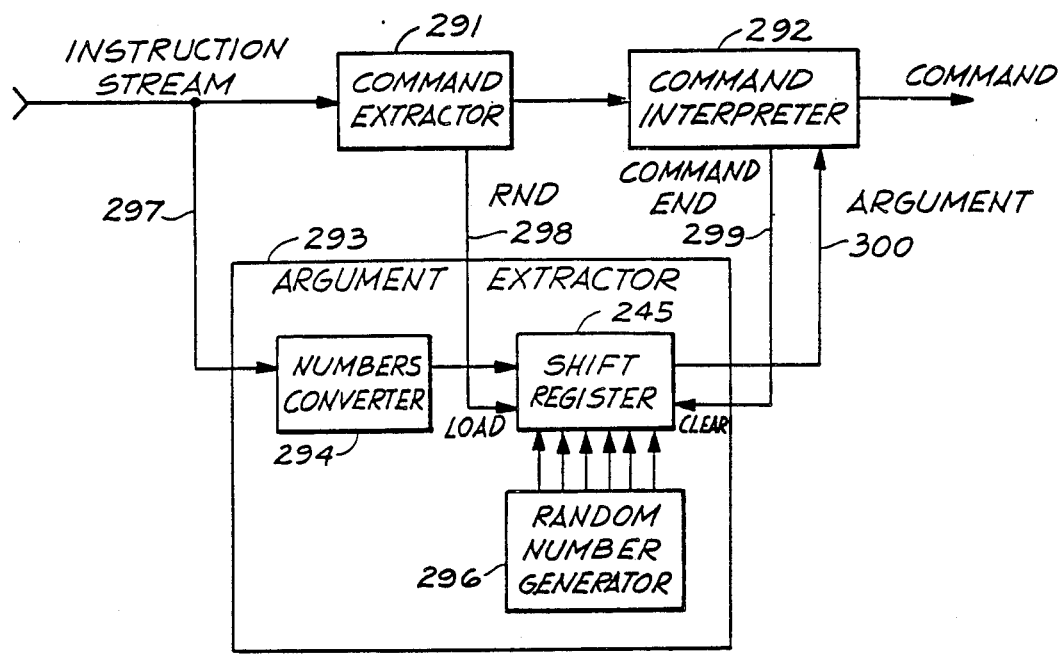
FIG. 12 is a block diagram of the circuitry needed to carry out the random-command function of the present invention.
Figure 13:
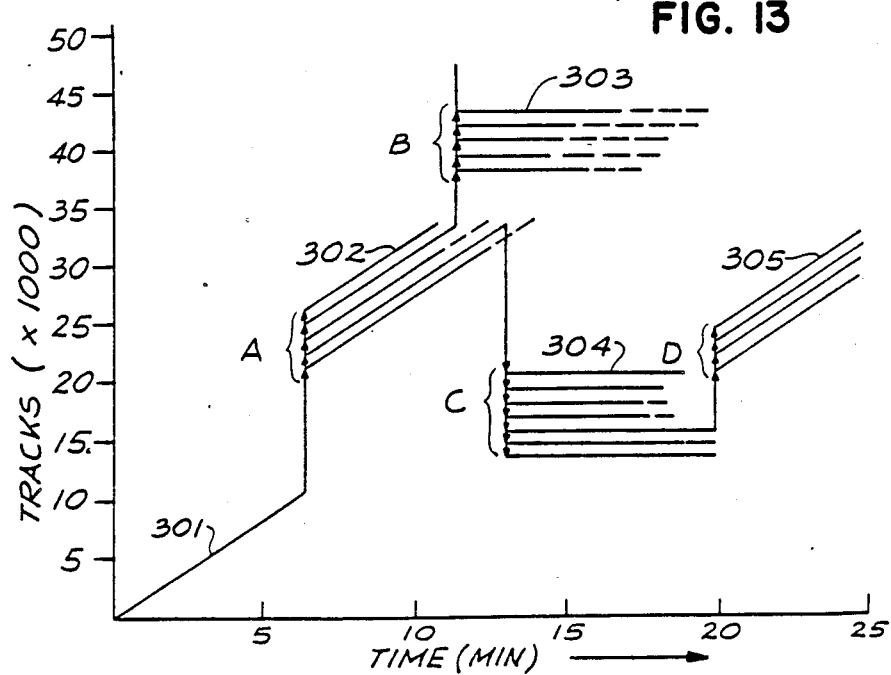
FIG. 13 is a pictorial representation illustrating one example of the use of the random-command feature of the invention.

FIG. 12 shows a functional block diagram of the random command function according to the present invention. FIG. 13 illustrates graphically the motion of the read beam when following a series of random command instructions.

When a disc is being played, each operational function of the machine under control of the microprocessor begins in orderly fashion after the conclusion of the preceding instruction. As a result, the orderly sequence of instructions can be thought of as an instruction stream flowing from the microprocessor and being interpreted by the player by analyzing the commands contained in each instruction. FIG. 12 illustrates the basic operation of receiving an instruction stream over line 297 and extracting, in command extractor 291, the command portion of the instruction and routing it to command interpreter 292. which then translates the command instruction to functional commands for the player. Likewise, the instruction stream enters argument extractor 293, and the numbers converter 294 extracts the argument portion of the instruction and sets it in shift register 295. The argument, for example a particular frame number in the recorded video program, is sent over line 300 to command interpreter 292 and becomes a part of the command function. Thus, the command output of command interpreter 292 contains a player functional control portion and an argument portion. Generally, the argument portion of the instruction sets forth a particular frame, and the command portion tells the player what to do at or with that frame. In a typical instruction, for example, the instruction "1200 search" is interpreted as commanding the player to carry out its searching function while looking for frame number 1200.

As explained earlier, in instances where the argument portion of the instruction is advantageously an unpredictable or random number, it is necessary that the argument extractor 293 not pass the argument through the command interpreter directly as received from the instruction stream, but rather to supply a random number on line 300.

To accomplish this desired result, a command, for example RND command, recognized by the command extractor 291 is sent over line 298 to a shift register 295 in the argument extractor 293. This recognition of the RND command will load a random number from random number generator 296 into shift register 295. As a result, a random number is outputted over line 300 as an argument to the command interpreter, and the stated objective is met.

If desired, the normal argument in the instruction converted in number converter 294 can be used as a basis for establishing a reference for the random number generator 296. For example. rather than to to have any random number produced by generator 296 to be loaded into shift register 295, the number exiting numbers converter 294 can represent a starting number from which a set of random numbers takes reference. Thus, if the argument exiting numbers converter 294 is 1200, the numbers loaded into shift register 295 could be any selectable range of numbers beginning at 1200. If a quiz having ten questions is presented at frames 1200 through 1209, then random numbers generator 296 would merely add, for each random command, any one of numbers 0 through 9 to the 1200 number exiting numbers converter 294, and this would result in loading shift register 295 with one of the numbers randomly selected from the set of numbers 1200 through 1209.

After the command instruction has been executed, a command end signal exiting the command interpreter 292 over line 299 will clear shift register 295 ready for the next instruction. In FIG. 13, the line 301 indicates a linear relationship between playing time and the number of the track being played at that time. At some point in time, for example after perhaps 12,000 tracks have been played, a random command instruction could be given to instruct the player to jump to any one of a plurality of tracks in the vicinity of track 25,000. This could happen, for example, if an "autostop" command were initially set at the beginning of playing time in FIG. 13, the "autostop" command merely placing the player in a stop motion condition upon recognition of a comparison between a preset frame number and the frame number recovered from the disc while playing. Thus, if the autostop frame number had been chosen at frame 12,000, the player would play along line 301 in FIG. 13 until frame 12,000 was identified in the comparator, and reference is made to the previous discussion FIG. 1 concerning blocks 29, 30, and 37 of that figure.

At the conclusion of that "autostop" command, the next instruction is assumed to be a random command instruction causing the player to immediately search for a randomly selected one of a plurality of numbers at track 25,000. This is shown at point A in FIG. 13. After arriving at the randomly chosen frame number in the vicinity of track 25,000, the player plays that randomly selected track shown at 302 in the drawing until another command instruction is received. In FIG. 13, two possibilities are shown, one at point B merely being a repetition of the kind of random search instruction given at point A, with the exception that after finding the randomly selected track in the vicinity of track 45,000, the randomly selected track would be played in a stop motion mode indicated at 303 in the figure. Had the random number selected been a different one, it could have followed a different command at the end of playing that segment of the disc identified in the figure as 302, and as a result, a search command could have directed the reading beam to the vicinity of track 20,000 to stop motion at one of an arbitrarily or randomly chosen track in that vicinity, and this is shown at 304 in the drawing. At point D is illustrated the possibility of returning, again randomly, to one of the tracks in the vicinity of track 25,000 in a manner similar to that described in connection with point A in the figure. If the group of tracks at point A were, for example, questions to a quiz, after having passed through points D and/or C, another one of the same group of questions could be presented at point D, and the play mode shown at 305 would be similar to that shown at 302, and the process repeated until all of the question of the quiz, or a predetermined number of them, were asked. In this connection, random number generator 296 can be, if desired, arranged to randomly select a number from a group of numbers without repeating a prior selected number. This would assure that the same question would not be asked twice on a quiz.

Of course, other applications of the random command function described above are possible than those associated with presenting questions to a quiz, and it should be understood that the invention is not to be so narrowly interpreted as to be limited to the specific examples presented above.

Multiple Track Jump Command

Having described the manner in which the tracking controller 67 operates in FIGS. 1 and 2 and the manner in which the stop motion mode functions according to FIG. 7 and its associated description, the present invention also includes a method and means for combining these two functions to produce certain special effects heretofore not realizable. Furthermore, with the additional capabilities of the player having a field step mode, described earlier, additional benefits and functions of the player can be uniquely produced.

The multiple track jump function of the player is to be distinguished from the jump function associated with a search mode operation. In the search mode of operation outlined in the aforementioned U.S. patent application Ser. No. 310,021, after a carriage movement has brought the reading beam to within a prescribed distance from a target track, a jump command is given to the tracking mirror in the optical system 17 of the invention to effectuate a broad jumping of tracks to arrive at the target track, counting the number of tracks jumped while the read beam is on its way to the target track. However, in a search mode of this nature, the number of tracks to be jumped are usually substantial, and a number are accomplished during each half revolution of the disc. Jumping tracks in this manner produces severe visual noise in the reproduced picture, since the multiple track jumping occurs at an arbitrary circumferential location on a disc such that any jumping occurring outside the vertical blanking interval will be seen as noise on the screen.

In the instant case, the number of tracks jumped are to be held to a very small number, on the order of ten or less, and with improved electromechanical devices for the tracking servo, jumps of up to ten tracks can be made during the vertical interval blanking time without disturbing visual noise being generated. Furthermore, as opposed to a search-type of track jumping where a present track address is subtracted from a target track address and the number of track crossings are counted to permit landing of the reading beam at the target track, in the present invention the multiple track jumping is to be effected at regular intervals or according to a prescribed pattern with a play function occurring between each jump function.

This is exemplified in FIG. 14 by way of example. In FIG. 14a, the letters represent a particular visual picture frame as shown in FIG. 14b. The left to right direction of FIG. 14a represent a spatial arrangement of the individual picture frames A through D. With the particular arrangement shown, starting with frame 311, picture frame 323 would be shown first on the screen. The loop 313 over letter C suggests that an adjacent track containing picture C is jumped over by kicking the tracking servo, in the manner previously described, so as to play track B which will result in a display of picture frame 325. Similarly, the next picture frame B will be jumped over, and frame C will be displayed as shown at 327, followed by frame D shown at 329. After playing track D, loop 315 represents a jump back of two frames to play frame 317 which again contains the information of picture frame A shown at 323. This reverse looping, jumping back two tracks and playing one, continues until the last loop 319 leads to the playing of track D shown at 321 which then continue in a play mode to again play track A at 311 and the entire process repeats. In this manner, the sequence of picture frames displayed on a monitor would be A B C D A B C D A B C D, etc. In the simplified pictures illustrated in FIG. 14b, the effect of this continual repetition of the four picture frames in sequence will be that of a moving marquis shown at 331. Of course, more frames can be interleaved, and other more complicated figures can be contained in the tracks so as to give motion or other special effects to the recorded material. The advantage of such a system should be readily apparent, i.e., in the example shown a continuous motion of indicia across a screen is accomplished by utilizing only eight tracks of the videodisc, whereas in the past, motion presentation on the screen required real time territory for the same kind of presentation, i.e., 30 frames for each second of time the effect is to be displayed.

Since the time in which the tracking servo is kicked forwards or backwards is under microprocessor control of the function generator 37, if the example of FIG. 14b is to show the indicia moving at a slower rate, each track played in the example given could be played 2, 3, or more times before jumping to the next track.

Figures 15, 16:
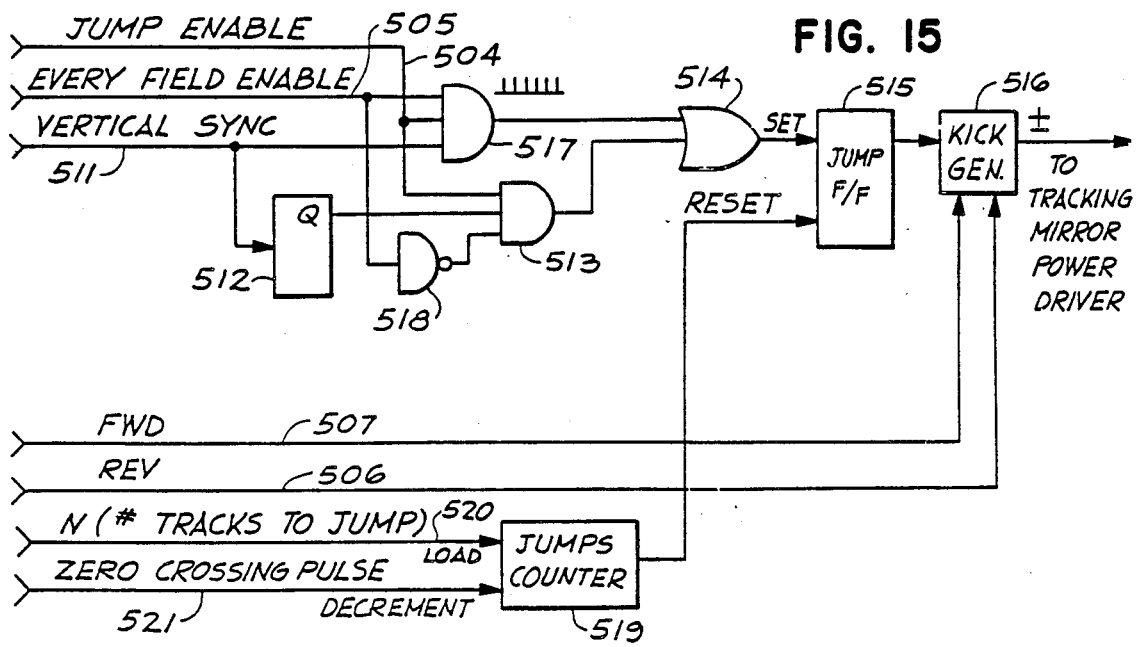
FIG. 15 is a block diagram of the synchronous jump electronics associated with the multiple track jumping feature of the invention.
FIG. 16 is a table showing the direction and number of tracks jumped to perform various forward and reverse speeds for the videodisc player.

Another extension of the multiple track jump function can advantageously produce forward or reverse multiple playing speeds. FIG. 15 shows in block diagram form a preferred arrangement for accomplishing multiple playing speeds by utilizing the multiple track jumping effect. Again, it is to be realized that all jumping of tracks occur during the vertical interval, and therefore the circuit of FIG. 15 produces completely synchronous picture display at multiple speeds, forward or reverse, without the distraction of visual noise as in prior art track jumping devices.

In analyzing FIG. 15, it will also be appreciated that, with the additional flexibility of being able to jump field by field in the manner described earlier, other advantages in simplifying the electronics can be realized. Accordingly, the circuit of FIG. 15 will utilize either a frame jump or a field jump mode, depending upon which is more suitable for the playing speed desired.

Similar to the jumps down counter 101 in FIG. 2, a jumps counter 519 is shown in FIG. 15 which is loaded with a number N on line 520 representing the number of tracks to jump on command. Also, similar to the decrementing of counter 101 by the zero crossing detector 99 of FIG. 2, a zero crossing pulse to decrement jumps counter 519 is inputted on line 521.

Kick generator 516 will impart a radial motion to the tracking mirror, forward or backward, depending upon whether the microprocessor is sending a forward signal on line 507 or a reverse signal on line 506. Kick generator 516 is responsive to a true output from jump flip-flop 515 each time it is set. Either AND gate 517 or AND gate 513 can set flip-flop 515 and effectuate a kick to the tracking mirror if enabled by jump enable signal on line 504. Jump enable occurs when a jump of one or more tracks is called for by the microprocessor.

Since advantage can be taken of jumping every field, as opposed to every frame, an "every field enable" signal on line 505 is another input to AND gate 517, and through inverter 518 it disables AND gate 513. Accordingly, when every field is to produce a jump, AND gate 517 will pass vertical sync pulses from line 511, and when a jump is to occur once per frame, the "every field enable" signal on line 505 will be low disabling AND gate 517 and, through inverter 518, enable AND gate 513. Flip-flop 512 is a toggle flip-flop which produces a true output to AND gate 513 for every other vertical sync pulse received on line 511. Thus, when a jump is to be effected, jump enable line 504 is brought true, and either every vertical sync pulse from AND gate 517 or every other vertical sync pulse from AND gate 513 will pass through OR gate 514 and set jump flip-flop 515 to create the kick to the tracking mirror. As the tracking mirror moves across each track, during the vertical interval, each zero crossing decrements counter 519 until the number of tracks to be jumped has been counted down to zero in counter 519, at which time a reset pulse from counter 519 resets jump flip-flop 515 so as to preclude any further kicking motion of the tracking mirror.

Since kick generator 516 will react only if a number is loaded into jumps counter 519, if no number is loaded, no stop motion pulse is generated, and the player plays forward at normal speed. Moreover, when the player is in the normal "play" mode, no jumps will be made, since the read beam follows a spiral track. A table, FIG. 16, shows the conditions for jump direction and for the value of N or M, i.e. the number loaded into jumps counter 519, for a variety of play speeds, both forward and reverse, as well as stop. The table shows that no jumps are required in the play forward mode.

The number of tracks to jump is different if the kick generator is subject to being pulsed at a field rate than if it is being pulsed by a frame rate. Accordingly, if "EVERY FIELD ENABLE" line 505 in FIG. 15 is a logical "1", then jumps counter 519 is loaded with a number M designating the number of tracks to jump each field change, while if "EVERY FIELD ENABLE" line 505 is a logical "0", jumps counter 519 is loaded with a number N designating the number of tracks to be jumped each frame change. Thus, N or M takes on different values depending upon whether the "every field enable" signal on line 505 is a logical "1" or logical "0". If the "every field enable" signal is a "0", then when the number of jumps equal 1 and the jump direction is forward, the player plays at a times two, (2×), speed. Since one revolution of the disc causes the read beam to follow one spiral track forward, in order to get a normal play reverse speed, the kick generator must be pulsed in reverse, and the number of tracks to jump per revolution is 2. Continuing the analysis along these lines produces the numbers in the right hand column of FIG. 16, and it can be appreciated that by selecting the value of N, any play speed which is a multiple of the normal play speed can be selected by the various values of N given. It should be borne in mind, however, that, as stated earlier, since the jumps must occur in the vertical interval to avoid visual noise, there is a practical limit to the upper values of N in either forward or reverse direction.

With the capability of jumping during the vertical interval on a field basis, the number of tracks jumped to produce higher values of play speed will be less, and thus a more reliable, noise-free picture can be played at higher play speed than with the limitation of being able to jump only on a per frame basis. The second column of FIG. 16 illustrates this fact by showing that when jumping forward one track every field, i.e., when M=1, a 3X speed can be realized, and jumping two tracks each field, (M=2), produces a 5× speed in the forward direction. In an extension of this analysis in the reverse direction, normal play reverse speed can be produced by jumping back one frame every field. Similarly, a −3× speed is produced with a jump of two tracks per field in the reverse direction, while a −5× speed occurs with a reverse jump of three tracks per field. Of interest in the field step mode is the fact that certain play speeds are not possible, for example a 4× forward, a 2× forward, a 2× reverse, and a 4× reverse speed.

In a general analysis, again realizing the limitations on the number of tracks that can be jumped during the vertical interval, a forward speed of (N+1) X is produced with N jump forward for each frame, while a (1-N) X speed results in the reverse frame jump mode. Similarly, with M jumps every field, forward speeds will calculate to (2M+1)X, while reverse speeds will calculate to (1−2M) X.

White Flag Wait Function

It is often desirable to transmit information contained on a videodisc to an external using device. The device may be asynchronous with self clocking capabilities such that it is only necessary to transmit the information to the external device when it calls for it or when the transmitting device sends a precursor pulse to prepare the external equipment for the information to be transmitted immediately following such precursor.

The procedure for transmitting information from a videodisc would normally be to play or search to a certain frame number, perform an autostop at that frame number (i.e., enter a stop motion mode), and subsequently enter into a play mode such that at the start of the next frame, the vertical sync pulse will trigger transmission of the information to be transmitted to the external device. A problem arises, however, due to the fact that an autostop function replays two fields, it is not always predictable where the read beam will land in the autostop mode. As a result, the next vertical sync pulse could be at the end of the first field or at the end of the second field of the frame stopped on. Since the external equipment must not receive false information from the incorrect field, it is necessary to reliably establish which field is being played, so that transmission after the second field (assuming that is the desire of the user) will be effectuated.

Figure 17:
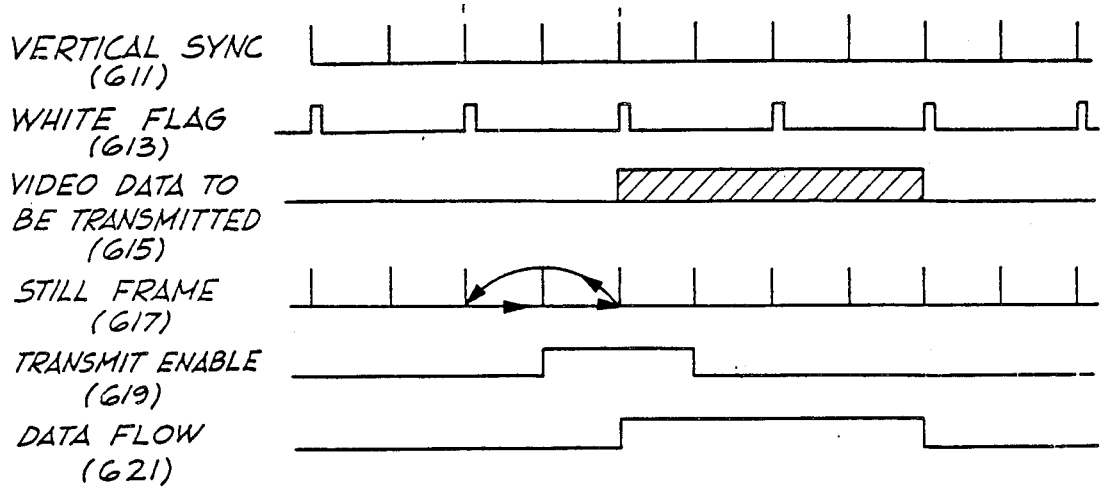
FIG. 17 is a timing chart showing the relationships between the various waveforms necessary to perform a white flag wait function according to the invention.

FIG. 17 illustrates the waveforms needed to perform transmission of the data at the proper time. A vertical sync pulse on line 611 occurs between fields, as is known, and this is represented in FIG. 17 by equally spaced pulses. During alternate vertical intervals, a white flag signal 613 can be detected as was described in connection with white flag detector 257 in FIG. 7. The data to be transmitted is shown on line 615 to begin at point B and lasts for four fields. The data to be transmitted may be video in nature, pulse code modulated audio, analog audio, or digital data on either the audio or video channels of the recorded program.

Stop motion is accomplished in the manner described in connection with FIG. 7 and is shown on line 617 of FIG. 17 in the form of still framing between points A and B.

For proper and effective transmission of the data on line 615, a transmit enable signal 619 must begin on the vertical sync pulse just prior to point B so as to give advanced indication to the external unit that data flow is about to start. A data flow gate signal 621 is then generated at the next vertical sync pulse (time B) and lasts for any preferred duration, and in the example given here for a period of four fields.

Figure 18:
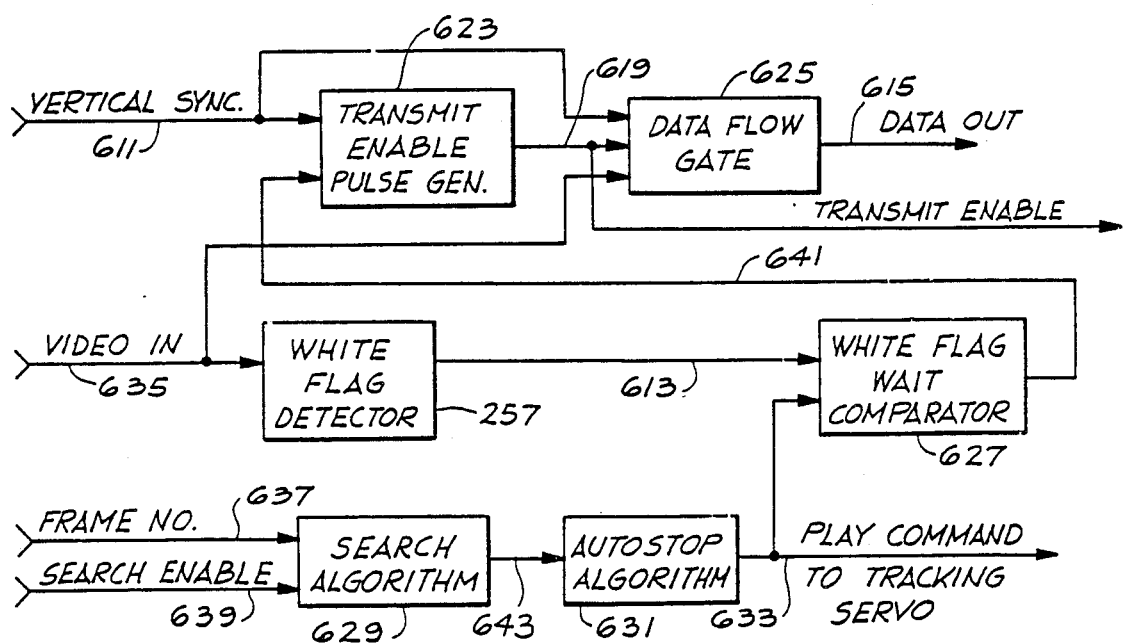
FIG. 18 is a block diagram showing the interconnections for accomplishing the white flag wait feature of the invention.

FIG. 18 is a block diagram employed to implement the white flag wait function described in connection with the waveform analysis of FIG. 17. Recalling again from FIG. 1 the searching feature of the function generator 37, address recovery 29, and register 30, a search algorithm 629 is performed in the manner described in the aforementioned U.S. patent application No. 316,021 having received a target frame number on line 637 and a search enable command on 639. Assuming the search has been successful to find the target frame number, an output on line 643 causes the autostop algorithm 631 to perform its function of stop motion at the frame preceding the data to be transmitted. At the conclusion of the auto stop, i.e., after successful location and commencement of the still framing mode at the target track, a play command is routed to the tracking servo over line 633 to begin the play mode operation of the player.

From the video in line 635, white flag detector 257 extracts the white flag signal and outputs it over line 613 to white flag wait comparator 627. Thus, during the play mode of an autostop function, the next white flag will generate an output of comparator 627 over line 641, and this output is routed to the transmit enable pulse generator 623.

In the autostop mode, it can be appreciated by reference to FIG. 17 that during the play portion of the still framing function, only the white flag immediately following point B will be detected since the read beam is kicked back from point B to point A due to the detection of the white flag occurring immediately following point B. Since white flags, as well as other vertical and horizontal timing signals are arranged radially of the disc, a jump back caused by a white flag at point B will place the read beam downstream of the white flag at point A. Thus, the signal from comparator 27 on line 641 must necessarily be the white flag following the vertical sync at point B. As a result, transmit enable pulse generator 623 is enabled by that white flag occurring immediately after point B, and, after kickback to point A, the next vertical sync pulse on line 611 produces an output on line 619 which begins at the next vertical sync pulse in time, and through the use of appropriate and known toggle flip-flop and gating, the transmit enable signal 619 will be terminated on the second next vertical sync pulse. As a result, a transmit enable pulse in the form of a window of time has been generated to span the vertical pulse occurring at point B. The transmit enable signal, together with the next vertical sync pulse in time from line 611 will create a data flow gate in block 625 which gates the data to be transmitted over line 615 to the external equipment. Again, depending upon the amount of time needed for transmission of the data, appropriate counters and gating can be arranged in a known manner to terminate the data flow pulse 621 at the proper time. In the instant case, a counter and gate structure allowing four fields of data to be transmitted is shown.

It can thus be seen that no matter what field the read beam lands in in the auto stop mode, initiation of the transmit enable pulse will not take place until after a white flag occurs during the normal play portion of the autostop function, and this "white flag wait" functioning insures proper transmission of the data coincident with the vertical sync pulse occurring at point B in FIG. 17.

Although the invention has been described in detail with reference to its presently preferred embodiments, it will be understood by those of ordinary skill in the art that various modifications can be made, without departing from the spirit and scope of the invention. Accordingly, it is not intended that the invention be limited, except as by the appended claims.

What is claimed is:

1. A method of transmitting intelligence information from a playback device to an external receiving device said intelligence information being recorded in at least one video field of a video information signal recorded on a record medium, the video information signal being recovered by said video playback device, the video information further containing in part a sequence of vertical synchronization pulses occurring at a field rate, wherein a white flag identifies the end of the second field of a two field per frame set, said method comprising the steps of:
    searching for, locating, and playing a designated frame next preceding in time the video field containing at least the beginning of said intelligence information;
    detecting the next white flag signal occurring in time, said next white flag signal being the one associated with said designated frame;
    jumping back two fields responsive to detecting said next white flag signal;
    playing said two fields in a forward play mode;
    utilizing the next vertical synchronization pulse in time, after said jumping back two fields and during playing of said two fields, to generate a transmit enable pulse;
    utilizing the transmit enable pulse to generate a data flow enable gate signal at the coincidence of said transmit enable pulse and the next white flag signal occurring in time; and
    gating said intelligence information to an external receiving device in response to said data flow enable gate signal.

2. The method as claimed in claim 1, further including the step of terminating said transmit enable pulse with the next recurring vertical synchronization pulse occurring after the beginning of said data flow enable gate signal.

3. The method as claimed in claim 1, including the steps of:
    determining the field length of the intelligence information to be transmitted;
    detecting the vertical syncrhonziation pulse coincident with the end of the last field containing said intelligence information; and
    terminating said data flow gate signal with the detected vertical synchronization pulse coincident with the end of the last field containing said intelligence information.

4. The method as claimed in claim 1, wherein the external receiving device operates asynchronously with said video playback device.

5. A method for transmitting information contained on a videodisc to an external using device in a controlled manner, comprising the steps of:
    (a) rotating the disc in a prescribed fashion and recovering information on the disc by detecting modulation of a read beam;
    (b) locating a target frame on the disc, said target frame located at a position next preceding the position of the frame containing at least the beginning of the information which is to be transmitted to the using device;
    (c) initiating a stop motion function on the target frame detecting a white flag during vertical interval time, and then jumping back a frame, and replaying the target frame;
    (d) detecting a white flag occurring during the vertical interval while replaying the target track in step c);
    (e) selecting the next vertical sync pulse occurring in time after detection of the white flag in step d) to initiate a ready signal to be sent to the external using device; and (f) transmitting said information to said external using device after initiation of said ready signal.

6. The method as claimed in claim 5, including:
counting the vertical sync pulses after beginning transmission of said information in step f): and
terminating said transmission of step f) after counting a predetermined number of said vertical sync pulses.

7. The method as claimed in claim 5, wherein:
said transmitting step f) includes transmitting said information to said external device at the next vertical sync time occurring after initiation of said ready signal.

8. The method as claimed in claim 7, where:
said transmitting step f) includes transmitting said information to said external device at the vertical sync time coincident with the initiation of said ready signal in step e).

9. Apparatus for transmitting information contained on a videodisc to an external using device in a controlled manner, comprising:
(a) means for rotating the disc in a prescribed fashion and for recovering information on the disc by detecting modulation of a read beam;
(b) means for locating a target frame on the disc, said target frame located at a position next preceding the position of the frame containing at least the beginning of the data which is to be transmitted to the using device;
(c) means for initiating a stop motion function on the target frame, including means for playing the target frame, a white flag detector for detecting a white flag during vertical interval time, kickback means for jumping said read beam in reverse one frame, and means for replaying the target frame;
(d) first gating means for detecting and extracting a white flag occurring during the vertical interval while said target frame is being replayed by said means for replaying;
(e) second gating means for selecting the next vertical sync pulse occurring in time after detection of said white flag to produce a ready signal to be sent to the external using device; and
(f) gated transmitting means for transmitting said information to said external using device after initiation of said ready signal.

10. Apparatus as claimed in claim 9, including:
a counter for counting the vertical sync pulses after beginning transmission of said information; and
third gating means for terminating said transmission after counting a predetermined number of said vertical sync pulses.

11. The apparatus as claimed in claim 9, whereby:
said gated transmitting means includes means for transmitting said information to said external device at the next vertical sync time occurring after initiation of said ready signal.

12. The apparatus as claimed in claim 9, wherein:
said gated transmitting means includes means for transmitting said information to said external device at the vertical sync time coincident with the initiation of said ready signal.

13. Apparatus for transmitting intelligence information from a playback device to an external receiving device, said intelligence information being recorded in at least one video field of a video information signal recorded on a record medium, the video information being recovered by said video playback device, the video information further containing in part a sequence of vertical synchronization pulses occurring at a field rate, wherein a complete picture frame is defined by two adjacent fields, and wherein a white flag identifies the end of the second field of a two field per frame set, said apparatus comprising:
player means for searching for, locating, and playing a designated frame next preceding in time the video field containing at least the beginning of said intelligence information;
means for detecting the next white flag signal in time, said next white flag signal being the one associate with said designated frame;
means for jumping back two fields responsive to detecting said next white flag signal;
means for playing said two fields in a forward play mode;
means responsive to detection of the next vertical synchronization pulse in time, after said jumping back two fields and during playing of said two fields, for generating a transmit enable pulse;
means responsive to the transmit enable pulse for generating a data flow enable gate signal at the coincidence of said transmit enable pulse and the next white flag signal occurring in time; and
gate means responsive to said data flow enable gate signal for gating said intelligence information to an external receiving device.

14. The apparatus as claimed in claim 13 further including means for terminating said transmit enable pulse with the next recurring vertical synchronization pulse occurring after the beginning of said data flow enable gate signal.

15. The apparatus as claimed in claim 13, including:
means for determining the field length of the intelligence information to be transmitted;
means for detecting the vertical synchronization pulse coincident with the end of the last field containing said intelligence information; and
means for terminating said data flow gate signal with the vertical synchronization pulse coincident with the end of the last field containing said intelligence information.

16. The apparatus as claimed in claim 13, wherein the external receiving device operates asynchronously with said video playback device.

* * * * *

UNITED STATES PATENT AND TRADEMARK OFFICE
CERTIFICATE OF CORRECTION

PATENT NO. : 4,706,133
DATED : November 10, 1987
INVENTOR(S) : Gary M. Giddings

It is certified that error appears in the above-identified patent and that said Letters Patent is hereby corrected as shown below:

On the title page, under "Related U.S. Application Data" second line next to Ser. No. 368,792, cancel "January 14, 1982" and substitute --April 15, 1982--.

Signed and Sealed this

Thirtieth Day of November, 1993

Attest:

BRUCE LEHMAN

Attesting Officer

Commissioner of Patents and Trademarks